United States Patent
Thompson

(10) Patent No.: US 10,474,952 B2
(45) Date of Patent: Nov. 12, 2019

(54) SYSTEMS AND METHODS FOR MULTI-OBJECTIVE OPTIMIZATIONS WITH LIVE UPDATES

(71) Applicant: THE AEROSPACE CORPORATION, El Segundo, CA (US)

(72) Inventor: Timothy Guy Thompson, Purcellville, VA (US)

(73) Assignee: The Aerospace Corporation, El Segundo, CA (US)

( * ) Notice: Subject to any disclaimer, the term of this patent is extended or adjusted under 35 U.S.C. 154(b) by 946 days.

(21) Appl. No.: 14/847,424

(22) Filed: Sep. 8, 2015

(65) Prior Publication Data
US 2017/0068890 A1 Mar. 9, 2017

(51) Int. Cl.
G06N 3/12 (2006.01)
(52) U.S. Cl.
CPC .................. G06N 3/126 (2013.01)
(58) Field of Classification Search
CPC ...... G06N 3/126; G06N 3/086; G06N 99/005; G06N 3/12; G06N 5/04; G06N 5/003; G06N 5/045; G06F 17/30286; G06F 17/11
See application file for complete search history.

(56) References Cited

U.S. PATENT DOCUMENTS

| 5,255,345 A | 10/1993 | Shaefer |
| 5,319,781 A | 6/1994 | Syswerda |
| 5,568,500 A | 10/1996 | Furuya et al. |
| 6,532,076 B1 | 3/2003 | Sidorowich |
| 6,662,167 B1 | 12/2003 | Xiao |
| 6,941,287 B1 | 9/2005 | Vaidyanathan et al. |
| 7,835,929 B2 | 11/2010 | Bennett |
| 7,996,344 B1 | 8/2011 | Goel |
| 8,069,127 B2 | 11/2011 | Taylor et al. |
| 8,255,344 B2 | 8/2012 | Ferringer et al. |
| 8,255,345 B2 | 8/2012 | Ferringer et al. |

(Continued)

FOREIGN PATENT DOCUMENTS

WO  WO2010132804 A1  11/2010

OTHER PUBLICATIONS

Subbu et al., "Management of Complex Dynamic Systems based on Model-Predictive Multi-objective Optimization", Jul. 2006, IEEE International Conference (Year: 2006).*

(Continued)

Primary Examiner — Eric Nilsson
(74) Attorney, Agent, or Firm — Lee & Hayes, P.C.

(57) ABSTRACT

Systems and methods are provided for generating an initial optimized baseline solution to a multi-objective problem. As the baseline solution is implemented, live (e.g., real-time or near real-time) data associated with one or more parameters may be received and compared to expectations of those parameters with the implementation of the initial optimized solution. If a deviation is detected between the expectation of the time progression of the parameters and live data associated with the parameter, then that deviation may be compared to a threshold. If the deviation meets a threshold condition, then an irregular operation may be declared and a new baseline solution may be implemented. The new baseline solution may be obtained as a re-optimized solution.

20 Claims, 12 Drawing Sheets

(56) References Cited

U.S. PATENT DOCUMENTS

| | | | |
|---|---|---|---|
| 8,285,653 | B2 | 10/2012 | Ferringer et al. |
| 8,433,662 | B2 | 4/2013 | Ferringer et al. |
| 8,494,988 | B2 | 7/2013 | Ferringer et al. |
| 8,498,952 | B2 | 7/2013 | Ferringer et al. |
| 8,504,496 | B2 | 8/2013 | Ferringer et al. |
| 8,560,472 | B2 | 10/2013 | Ferringer et al. |
| 8,862,627 | B2 | 10/2014 | Ferringer et al. |
| 9,189,733 | B2 | 11/2015 | Thompson et al. |
| 9,321,544 | B2 | 4/2016 | Thompson et al. |
| 2002/0013776 | A1 | 1/2002 | Kishi |
| 2005/0187846 | A1* | 8/2005 | Subbu .................... G06Q 40/06 705/36 R |
| 2007/0005522 | A1 | 1/2007 | Wren |
| 2008/0010044 | A1 | 1/2008 | Ruetsch |
| 2008/0094250 | A1* | 4/2008 | Myr ........................ G08G 1/04 340/909 |
| 2008/0215512 | A1 | 9/2008 | Narzisi et al. |
| 2008/0234944 | A1 | 9/2008 | Schaffer et al. |
| 2008/0241839 | A1 | 10/2008 | Potkin et al. |
| 2009/0313191 | A1 | 12/2009 | Yao et al. |
| 2010/0040281 | A1 | 2/2010 | Chen et al. |
| 2010/0046806 | A1 | 2/2010 | Baughman et al. |
| 2010/0292929 | A1 | 11/2010 | Ferringer et al. |
| 2010/0293120 | A1 | 11/2010 | Ferringer et al. |
| 2010/0293122 | A1 | 11/2010 | Ferringer et al. |
| 2010/0293313 | A1 | 11/2010 | Ferringer et al. |
| 2011/0078100 | A1 | 3/2011 | Goel |
| 2011/0231320 | A1* | 9/2011 | Irving .................... G06Q 30/00 705/80 |
| 2011/0276527 | A1* | 11/2011 | Pitcher ................ G06F 17/5009 706/21 |
| 2012/0029965 | A1 | 2/2012 | Steffen et al. |
| 2012/0063590 | A1 | 3/2012 | Dortschy et al. |
| 2012/0084314 | A1 | 4/2012 | Ferringer et al. |
| 2013/0024395 | A1* | 1/2013 | Clark .................... G06Q 40/06 705/36 R |
| 2013/0054045 | A1 | 2/2013 | Ramezani et al. |
| 2013/0132042 | A1 | 5/2013 | Chan |
| 2013/0218526 | A1 | 8/2013 | Lev et al. |
| 2014/0278695 | A1 | 9/2014 | Smith et al. |
| 2015/0161629 | A1 | 6/2015 | Verma |
| 2017/0011292 | A1 | 1/2017 | Thompson |
| 2017/0169353 | A1 | 6/2017 | Thompson et al. |
| 2017/0293839 | A1 | 10/2017 | Thompson et al. |
| 2017/0364812 | A1 | 12/2017 | Thompson et al. |
| 2018/0082198 | A1 | 3/2018 | Thompson et al. |
| 2018/0082209 | A1 | 3/2018 | Thompson |

OTHER PUBLICATIONS

Sörensen, Kenneth. "Route stability in vehicle routing decisions: a bi-objective approach using metaheuristics." Central European Journal of Operations Research 14.2 (2006): 193-207. (Year: 2006).*

Office Action for U.S. Appl. No. 14/963,870, dated Oct. 3, 2018, Thompson et al, "Systems and Methods for Multi-Objective Evolutionary Algorithms with Soft Constraints", 28 pages.

Office Action for U.S. Appl. No. 15/094,521, dated Nov. 29, 2018, Thompson et al, "Systems and Methods for Multi-Objective Heuristics with Conditional Genes", 26 pages.

Abraham, Andrew, "Particle Swarm Optimization of Low-Thrust, Geocentric-to-Halo-Orbit Transfers," May 2014, Thesis and Dissertation, Lehigh University, 202 pages.

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common Environment"; 2000; IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries.psu.edu/lheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi-objective Optimization (Video)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Instituite of Technology; Evolutionary Computation 10(3); pp. 1-21.

Lorenz, Edward, "Predictability: A Problem Partly Solved," 1996, In Proc. Seminar on Predictability, vol. 1, No. 1, 18 pages.

Mackey et al, "Oscillation and Chaos in Physiological Control Systems," Jul. 15, 2977, Science. 197(4300): 287-289.

Muhlenbein et al.; "Evolution in time and space—the parallel genetic algorithm."; 1991; Morgan Kaufmann; pp. 1-22.

Office Action for U.S. Appl. No. 13/837,782, dated Jan. 15, 2015, Smith et al., "Systems and Methods for Prioritizing Funding of Projects", 21 pages.

(56) References Cited

OTHER PUBLICATIONS

Office Action for U.S. Appl. No. 13/837,782, dated Oct. 20, 2016, Smith et al., "Systems and Methods for Prioritizing Funding of Projects", 16 pages.
Office Action for U.S. Appl. No. 13/837,782, dated Mar. 30, 2017, Smith et al., "Systems and Methods for Prioritizing Funding of Projects", 20 pages.
Office Action for U.S. Appl. No. 13/837,782, dated Apr. 7, 2016, Smith et al., "Systems and Methods for Prioritizing Funding of Projects", 14 pages.
Office action for U.S. Appl. No. 14/796,299, dated Jun. 19, 2018, Thompson, "Systems and Methods for Multi-Objective Evolutionary Algorithms with Category Discovery", 22 pages.
Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Srinivas et al., "Multiobjective Optimization Using Nondominated Sorting in Genetic Algorithms," 1994. Evolutionary Computation, 2(3): 221-248.
Stodgell et al., "Satellite Rendezvous Tours Using Multiobjective Evolutionary Optimization." Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.
Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Tang, Yong, "Advancing Hydrologic Model Evaluation and Identification Using Multiobjective Calibration Sensitivity Analysis and Parallel Computation." ProQuest Information and Learning Company. 2007, 48 pages.
Tang et al., "Parallelization Strategies for Rapid and Robust Evolutionary Multiobjective Optimization in Water Resources Applications." Advances in Water Resources. 2006, 1-39.
Van Veldhuizen et al., "Considerations in Engineering Parallel Multiobjective Evolutionary Algorithms." IEEE Transactions on Evolutionary Computation. vol. 7, No. 2, Apr. 2003. 144-173.
Van Veldhuizen et al., "(Final Draft) TR-98-03 Multiobjective Evolutionary Algorithm Research: A History and Analysis" Oct. 14, 1998; pp. 1-30.
Ventura et al.; "JCLEC: a Java framework for evolutionary computation"; 2007; Springer-Verlag; pp. 381-392.
Zimmer et al., "Utilizing Evolutionary Algorithms for Problems with Vast Infeasible Regions and Expensive Function Evaluations." The Aerospace Corporation. Jun. 27, 2008, 12 pages.
Chootinan et al, "Constraint Handling in Genetic Algorithms Using a Gradient-Based Repair Method," Mar. 14, 2005, Computers & Operations Research, 33: 2263-2281.
Dauphin et al, "Identifying and Attacking the Saddle Point Problem in High-Diminesional Non-Convex Optimization," 2014, In Advances in Neural Information Processing Systems, vol. 27, 9 pages.
Farmani et al, "Self-Adaptive Fitness Formulation for Constrained Optimization", Oct. 2003, IEEE Transactions on Evolutionary Computation, 7(5):445-455.
Ishibuchi et al, "A Multi-Objective Genetic Local Search Algorithm and Its Application to Flowshop Scheduling," Aug. 1998, IEEE Transactions on Systems, Man, and Cybernetics—Part C: Applications and Reviews, 28(3): 392-403.
Kukkonen et al, "Ranking-Dominance and Many-Objective Optimization," Sep. 25, 2007, IEEE Congress on Evolutionary Computation, pp. 3983-3990.
Office Action for U.S. Appl. No. 14/796,299 dated Jan. 23, 2019, Thompson et al., "Systems and Methods for Multi-Objective Evolutionary Algorithms with Category Discovery," 15 pages.
Office Action for U.S. Appl. No. 15/267,528, dated Apr. 16, 2019, Timothy Guy Thompson, "Systems and Methods for Multi-Objective Optimizations with Objective Space Mapping", 25 pages.
Office Action dated Apr. 26, 2019 for U.S. Appl. No. 15/268,840 "Systems and Methods for Multi-Objective Optimizations with Decision Variable Perturbations" Thompson, 23 pages.
Office Action for U.S. Appl. No. 14/847,424, dated Apr. 19, 2019, Timothy Guy Thompson, "Systems and Methods for Multi-Objective Optimizations with Live Updates", 19 pages.
Patel et al., "Fast Mesh-Sorting in Multi-objective Optimization," 2015, Int'l Federation of Automatic Control (IFAC-PapersOnLine) 48(8), pp. 936-941.

* cited by examiner

SYSTEMS AND METHODS FOR MULTI-OBJECTIVE OPTIMIZATIONS WITH LIVE UPDATES

FIELD OF THE DISCLOSURE

Aspects of the disclosure are related generally to multi-objective evolutionary algorithms, and more particularly to systems and methods for live updates to multi-objective optimizations.

BACKGROUND OF THE DISCLOSURE

Large-scale value-based non-linear models often require large numbers of decision variables and constraints (e.g., over a million), potentially with vastly infeasible search spaces (e.g., discovery of feasible decision variable sets without a vastly infeasible search space mechanism may be relatively difficult or impossible). Multi-objective Evolutionary Algorithms (MOEA) may be particularly useful in optimizing problems with large number of interdependent variables. Often times in these MOEA, the initially determined optimization may not transpire as intended. This may be due to improper implementation of the optimized operation or due to perturbations that are not in the control of an implementer of the optimized solution. In these cases, the implementation of an optimized solution may differ from the optimized solution.

BRIEF DESCRIPTION OF THE DRAWINGS

Reference will now be made to the accompanying drawings, which are not necessarily drawn to scale, and wherein.

DETAILED DESCRIPTION

Figure 1:
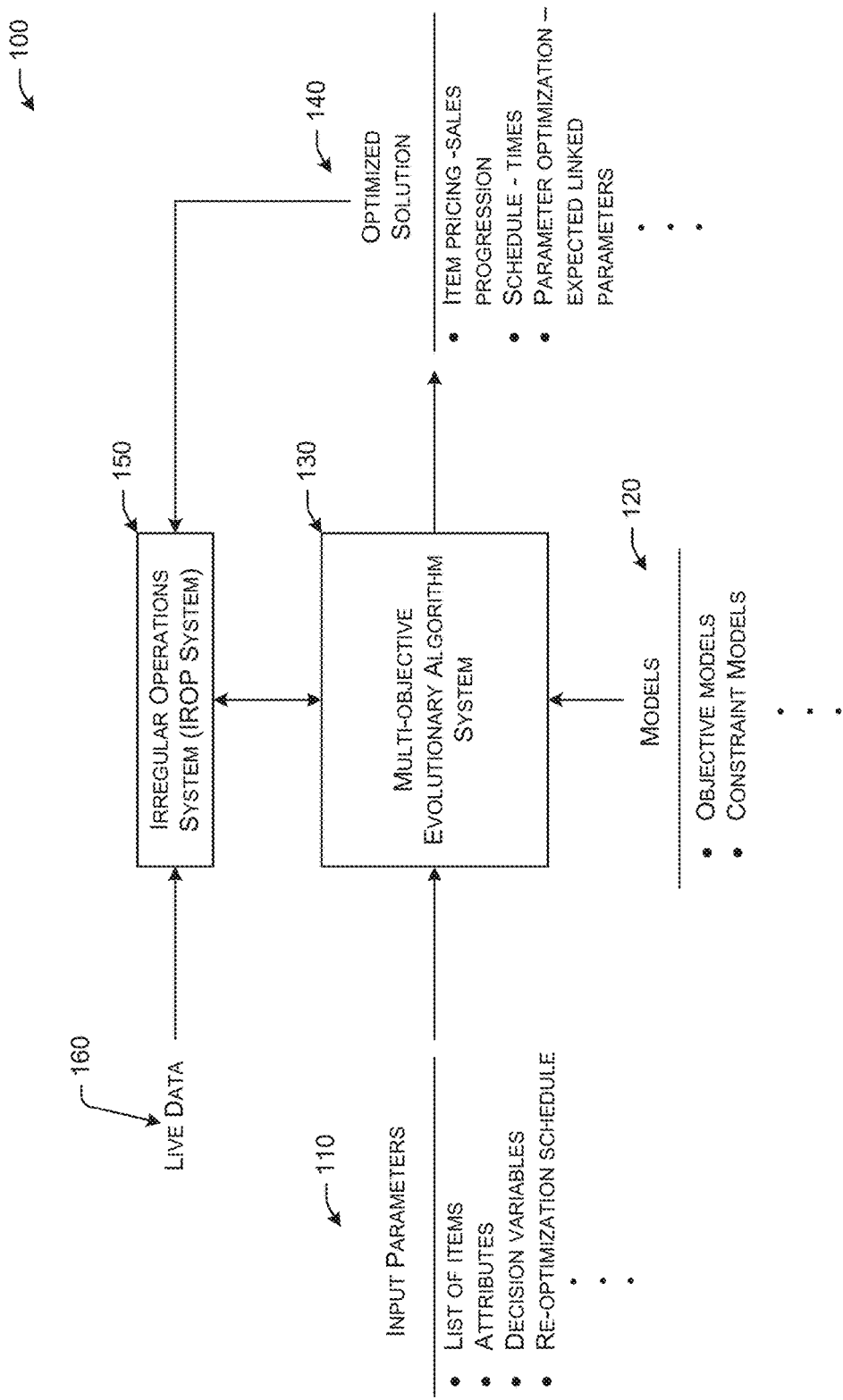
FIG. 1 is a schematic diagram that illustrates an example optimizing system with input parameters and optimized solutions based on one or more objective models and/or constraint models of a multi-objective evolutionary algorithm (MOEA) system with an irregular operations (IROP) system, in accordance with example embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a live optimization system having a multi-objective evolutionary algorithms (MOEAs) system, along with an irregular operations (IROP) system. Evolutionary algorithms have been described in a variety of other publications including commonly owned U.S. patent application Ser. No. 12/550,858, filed on May 12, 2010 and titled "Systems and Methods for Generating Feasible Solutions form Two Parents for an Evolutionary Process," the contents of which, in its entirety, is incorporated herein by reference.

In example embodiments, an initial multi-objective optimization may be performed by the MOEA system, prior to implementation of the optimized solution. Such an initial optimization may be performed for any suitable variety of applications. Such an initial optimization may be performed to optimize any suitable variety of objectives. An optimized solution may be one where the solution is non-dominated relative to other potential solutions. A non-dominated solution may be a solution where the solution performs no worse than another solution, when evaluated according to all of the objectives for that particular optimization, while performing better than all other solutions according to at least one of the objectives. When an initial multi-objective optimization is generated, the stakeholder (e.g., the entity requesting/using the optimization) may attempt to implement the optimized initial optimization.

In example embodiments, the MOEA system may further be configured to provide an expected time progression of one or more metrics associated with the initial optimization. In some cases, the one or more metrics may include one or more of the decision variables that were optimized in the initial optimization. In the same or other cases, the one or more metrics may include one or more of the expected objective values of the initial optimization. In yet further overlapping or exclusive example cases, the one or more metrics may include factors that may be derived from one or more of the decision variables and/or one or more of the expected objective values. In this way, the MOEA system may be configured to provide, such as to the IROP system, both an initial optimization, as well as, an expected time progression of one or more metrics associated with the initial optimization.

In example embodiments, the IROP system may be configured to receive the initial optimization and/or an expected time progression of one or more metrics associated with the initial optimization. In example embodiments, the initial optimization may be received by the IROP system prior to the implementation of the optimization by the stakeholders. In example embodiments, the IROP system may further be configured to receive live data (e.g., runtime, real-time, or near real-time data). In example embodiments, the live data, as received by the IROP system, such as from a variety of systems associated with the stake holder, may correspond, at least in part, to the expected time progression of the one or more metrics associated with the initial optimization, as received from the MOEA system. In other words, the live data may include the actual (e.g., live) progression of the one or more metrics for which expected progression is received from the MOEA system. As a result, in example embodiments, the IROP system may further be configured to track one or more live parameters or metrics, as received from live data systems, with the expected temporal progression of those parameters or metrics, as received from the MOEA system. The IROP system may still further be configured to determine if the comparison between the actual live data and the expected progression of the one or more metrics meet a threshold condition. The threshold condition may indicate an irregular operation in the attempt to implement the initial optimization, as provided by the MOEA system. Therefore, in example embodiments, the IROP system may be configured to compare live data to expectations thereof over time and identify an anomaly or irregular operation therefrom.

The IROP system, in some example embodiments, may further be configured to instantiate a further re-optimization when an irregular operation is detected from the comparison of the live data to expected metrics of the initial optimization. In other example embodiments, the MOEA system may continuously and/or periodically be performing re-optimizations and the IROP system, upon determining and/or declaring an irregular operation, may be configured to select or assist in selecting a new optimization as determined by the MOEA system on a regular and/or periodic basis. In some example embodiments, the IROP system may be configured to provide a decision maker with more than one choice of pareto-optimized solutions from which to choose as a new re-optimized target responsive to an anomaly. In example embodiments, the IROP system may initiate a re-optimization and/or select a new re-optimization where the re-optimization is performed with a reduced set of decision variables. In example embodiments, decision variables associated with events that may have already transpired may be frozen and, therefore, not optimized for during any re-optimization. In the same or different example embodiments, in addition to frozen decision variables associated with events that may have already transpired in time, there may be additional decision variables that may not be included in the re-optimization. In other words, in example embodiments, a re-optimization may be performed with a reduced set, relative to the initial optimization, of decision variable. In this way, a re-optimization may be performed faster and/or with reduced resources (e.g., processing power, number of cores, supercomputer time, etc.).

It will be appreciated that the multi-objective problem may be any suitable multi-objective problem and the systems and methods, as described herein, may be applied to any suitable subsequent tracking of a process relative to the multi-objective optimization. In example embodiments, the methods and systems, as described herein, may be suited for solving, tracking, re-optimizing, and/or re-deploying pricing optimization problems. In other example embodiments, the methods and systems, as described herein, may be suited for scheduling problems. In other example embodiments, the methods and systems, as described herein, may be suited for multi-parameter optimization. Indeed, in other example embodiments, the optimization problem to which the methods and systems described herein may be applied may be a combination of various elements, such as pricing, timing, or any other suitable parameter input.

In one non-limiting example, the initial optimization may be for a schedule of flights, times, and routes within a network of an airline. In this case, the stakeholder may be the airline and the multiple objectives may be any variety of general or industry specific considerations, such as profitability, fuel consumption, ground time, load factor, equipment non-utilization time, customer satisfaction metrics, on-time departures, lost bags, on-time arrivals, accumulated delays, combinations thereof, or the like. When the airline receives an initial optimization, such as from the MOEA system, the airline may attempt to implement that initial optimization throughout their flight network. This may include attempting to implement and/or control such factors as departure times, fueling points of equipment, allocation of equipment to routes, ground time, equipment/route mapping to arrival and/or departure gates, equipment mapping to airports, idle equipment allocations and/or movement, back-up equipment allocation to airports, equipment to location inventory, combinations thereof, or the like. Once the airline implements the initial optimization, the IROP system of the airline may receive live (e.g., real-time or near real-time) data, such as from various entities in the airline's network (e.g., scheduling computers, scheduling personnel, etc.). Such live data providing entities may be spatially distributed, such as, for example, at various airports served by the airline.

In example embodiments, as the live data is received and organized by the IROP system, the IROP system may be configured to compare the live data to the corresponding expectations of that data, as received from the MOEA system along with and/or as part of the initial optimization. For example, the live data may be departure times of the flights within the airline's network and the IROP system may compare the departure times the initially optimized departure times. This may be done in a variety of mechanisms, such as percentage delayed, percentage severely delayed, accumulated delays, accumulated/percentage delayed by region, combinations thereof, or the like. Regardless of the actual metric(s) used for tracking the delays in the airline's network, the metric(s) may be used to determine if a threshold condition is reached. As a non-limiting example, it may be determined that when 25% (e.g., the threshold condition/level) of the flights on the network are delayed, then there is an irregular operation, such as a weather induced anomaly in operations. As another non-limiting example, it may be determined that when the accumulated delays of flights have reached 100 hours (e.g., the threshold condition/level), there may be an irregular operation in the airline's network. In these particular non-limiting example, the metrics of comparison are either the decision variables (e.g., departure times), as provided by the initial optimization, or aggregates and/or functions thereof (e.g., percentage of flights delayed, accumulated delays across all flights, etc.). Indeed, it will be appreciated that any type of comparison may be made between the live data and the expected data to determine divergence(s) (e.g., either of the metric(s) themselves or of a function of the metric(s)) between expected and actual. Then the divergence may be compared to threshold level(s) to determine if an irregular operation has occurred.

Once an irregular operation has been identified by the IROP system, such as by a process of thresholding a comparison of live data to expected data, the IROP system may initiate a process of implementing a new baseline operation (e.g., a new optimized solution). Continuing with the airline optimization example, the IROP system, in some example embodiments, upon detecting/declaring an irregular operation, may proceed to request the MOEA system to perform a re-optimization. In this re-optimization, in some cases, there may be a reduced set of decision variables compared to the initial optimization. On one hand, events that have already transpired (e.g., flights that have already flown) may have their corresponding decision variables (e.g., genes in a solution chromosome in a MOEA) frozen and, therefore, not to be optimized. Further still, if the irregular operation is detected for flights in the Northeast of United States, then it may not be necessary to re-optimize flights on the West Coast of the United States, or in Europe, or East Asia. As a result, decision variables (e.g., genes in a solution chromosome) corresponding to flights on the West Coast USA, Europe, or East Asia may not need to be re-optimized and, therefore, may not be included in a re-optimization. In some example embodiments, the decisions about which decision variables may be included or excluded in a re-optimization may be made and/or facilitated by the IROP system. It will be appreciated that with a reduced set of decision variables fewer computing resources and/or reduced time may be needed for performing the re-optimization. As a non-limiting example, the initial optimization may use 50,000 cores for 2 hours, while a reduced decision space re-optimization may only involve 1,000 cores for 30 minutes.

In some example embodiments, the multiple objectives that may be optimized and/or the relative weighting/importance thereof may also be different for the re-optimization compared to the initial optimization. For example, the initial optimization for the airline may optimize profits, fuel consumption, customer satisfaction, and delay, in that order of importance. However, when an irregular operation, such as an anomaly resulting from a snow storm in a hub connection city is encountered, the importance of the objectives may be re-ordered, such as customer satisfaction, delay, profits, and fuel consumption. In some cases, there may be a reduced set of optimization objectives in a re-optimization compared to the initial optimization. It will be appreciated that with a reduced set of objectives to which to optimize, fewer computing resources and/or reduced time may be needed for performing the re-optimization.

In other example embodiments, instead of initiating a re-optimization upon detecting an irregular operation, the MOEA may be continuously performing re-optimizations that take the live data into account. In these re-optimizations, for example, decisions variables pertaining to events that have already transpired may be frozen out of the optimization. Additionally, predefined reduced decision variable re-optimizations may be performed continuously or on a periodic basis. In these embodiments, once the IROP system detects an irregular operation, a new baseline to which to perform may be implemented by selecting from the latest, or a recent, re-optimization performed by the MOEA system. A re-optimization, in this example embodiment, may already be available when an irregular operation is identified. As a result, there may not be a delay in the implementation of the re-optimization where the re-optimization is to be provisioned and performed.

As was discussed above, the MOEA system, when performing the optimization, provides a pareto-optimized front. These provide optimized solutions, where each of the pareto-front solutions are no worse than any of the other pareto-front solutions. In example embodiments, when the IROP system identifies an irregular operation by comparing live data to expected results, the IROP system may be configured to provide two or more optimized options from along the pareto-optimized front, as generated by the MOEA system, as options for selection for a new baseline operation. Continuing with the airline scheduling problem, suppose that a network disruption due to weather in a hub city of Atlanta was detected, a re-optimization option may be provided that re-routes a majority of the Atlanta connections through Washington, D.C., or another re-optimization option or re-routing through Houston, Tex. In this case, a decision maker (e.g., and executive or a committee) at the airline may be given the option of selecting between the two options as the next baseline implementation.

It will be appreciated that the systems and methods, as described herein, may be configured, in example embodiments, for any variety of suitable optimization problems, including the aforementioned scheduling problems. For example, scheduling problems may include optimizing the scheduling of various services associated with transportation, delivery courier, logistics, just-in-time manufacturing, combinations thereof, or the like. In such problems, items such as delivery times, arrival delays, non-deployed time, maintenance time, consumable usage, maintenance, revenues, costs, profits, return on capital (ROC), return on investments (ROI), combinations thereof, or the like may be optimized. Indeed, it will be appreciated that any type of scheduling problem may be applied to the systems and methods, as described herein. In example embodiments, these types of problems may be prone to a variety of weather, emergency, and/or asset/infrastructure impairment related irregular operations. In some example embodiments, the systems and methods, as described herein, may be particularly suited for solving relatively highly-constrained multi-objective scheduling optimization problems.

In another non-limiting example, the systems and methods, as described herein, may be applied to optimizing the pricing of various hotel rooms that may be available to a hotel or chain of hotels. The pricing may be optimized within the constraints of offering the hotel rooms for rental. In this example, each of the various types of rooms (queen bed/facing the beach, two double beds/facing the pool, etc.) may be represented as separate prices for rental. The prices of the hotel rooms may be determined based at least in part on expected demand of the hotel rooms at various rental prices. The initial optimization may provide a price for each room of a hotel chain for each rental day at some predetermined time in the future. These optimized variables may be provided and implemented, such as by offering the rooms for sale at the optimized prices, by the hotel chain operator. In addition to the pricing of rooms offered for sale across the network of the hotel chain (e.g., pricing by location, season, room type, room size, view, amenities, packages, etc.), the MOEA may provide an expected progression of sales as a function of the time until the rental date arrives. The MOEA may also provide continuous updates to the initial optimization. In some example embodiments, these continuous updates may use a different and/or reduced set of decision variables compared to the initial optimization and/or a different and/or reduced set of objectives compared to the initial optimization. The IROP system may continuously compare the expected progression of sales (e.g., percentage of inventory sold as time till the rental date) to actual live data. If an irregularity is detected, by thresholding any differences between actual and expected data, then a decision maker may be given an opportunity to pick from a variety of new optimized solutions for implementation. Alternatively, the IROP system itself may pick an optimized solution and push into implementation the same.

Continuing with the hotel room example, suppose that it is found that hotel rooms in Hawaii are being booked at a rate lower than expected by the initial (or prior) optimizations. In this case, the IROP system may select an optimization where the prices of hotel rooms in Hawaii may be reduced to encourage a pick-up in the reservations of such rooms. In this case, it will be appreciated that the metric that may be tracked (e.g., predicted percentage reservations of inventory) may not be a decision variable (e.g., prices of various types of hotel rooms) of the initial optimization or any subsequent optimization. Instead the tracking metric may be supplied by the MOEA system in addition to the optimized solution to be implemented.

It will be appreciated that the systems and methods, as described herein, may be configured, in example embodiments, for any variety of suitable optimization problems, including the aforementioned pricing optimization problems. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In such pricing problems, items such as non-deployed time, cancellations, vacancies, overbooking, consumable usage, maintenance, revenues, costs, profits, return on capital (ROC), return on investments (ROI), combinations thereof, or the like may be optimized. In some example embodiments, the systems and methods, as described herein, may be particularly suited for solving relatively highly-constrained multi-objective pricing optimization problems.

In another non-limiting example, a semiconductor manufacturer may optimize a product mix for a particular factory to maximize a variety financial objectives, such as revenue, profits, ROI, ROC, etc. The MOEA system may provide an optimized mix of products (e.g., wafer starts per week) of various products, by considering the aforementioned multiple objectives, that may be manufactured in the factory and predict yield and revenue from each of the products. The IROP system may be deployed to compare live data against the expected yield and revenue resulting from the various products being manufactured in the factory. Upon identifying an irregular operation, a variety of new pareto-optimized product mixes may be offered to decision maker for selection and implementation.

In other manufacturing based examples, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for solving relatively highly-constrained multi-objective manufacturing optimization problems.

It will still further be appreciated that the systems and methods, as described herein, may be configured, in example embodiments, to ascertaining trade-offs in the factor input space of various production and/or services. For example, a consulting firm may apply the methods and systems described herein to identify if the types and volumes of consultancy services that may be offered to optimize the level of risk versus profit that may be assumed by the firm. In another example, a company may use the methods and systems, as described herein, to determine how many and of what training and experience of employees it should hire to meet one or more of its objectives.

FIG. 1 is a schematic diagram that illustrates an optimizing system 100 with input parameters 110 and optimized solutions 140 based on one or more objective models and/or constraint models 120 of a multi-objective evolutionary algorithm (MOEA) system 130 with an irregular operations (IROP) system 150, in accordance with example embodiments of the disclosure. While a particular configuration of the optimizing system 100 is depicted herein, it will be appreciated that the configuration may vary depending on particular application of the MOEA system 130, according to various embodiments of the disclosure. Indeed, there may be any variety of input parameters 110, models 120, MOEA system 130, IROP system 150, and/or optimized solutions 140.

The input parameters 110 may be any suitable set of parameters, including, in example embodiments, a listing of decision variables, such as decision variables and attributes of those decision variables. Decision variables may be the elements that may be thought of as arranged as genes in a chromosome (e.g., data elements in an array). The decision variables may be the elements that are optimized during an multi-objective optimization as performed by the MOEA system 130. These multi-objective optimizations may generate an optimized solution that may be implemented as a baseline implementation of an particular entity (e.g., airline network, factory, hotel chain operator, etc.). For example, in the context of pricing hotel rooms, as discussed above, decision variables may include the price of each of the various types of rooms, where the types of the rooms may be described by the attributes of the decision variables. The attributes may include any variety of descriptors and/or parameters associated with a corresponding decision variables. These descriptors may be any variety of naming of the item or any type of parameters that may indicate any quality or naming of the items. For example, in reference to the previous example of the hotel rooms, the attributes may include descriptors of a particular element (e.g., type of hotel room). Such descriptors may include, for example, location, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular decision variable among more than one (e.g., many) decision variable.

In some example embodiments where the MOEA system 130 may be performing continuous and/or periodic re-optimization, based at least in part on live data, parameters for performing these re-optimizations may be provided. For example, the optimization stopping criteria may be different than the stopping criteria for the re-optimization. Also, the re-optimizations may be performed continuously or periodically with a predefined periodicity. Furthermore, a different set of decision variables and/or objectives may be used in the re-optimization. Therefore, any or some of these factors and parameters may be pre-defined and provided to the MOEA system 130 as part of the input 110. In other example embodiments, the re-optimization parameters may be provided by the IROP system 150.

The models 120 may include objective model(s) and constraint model(s) that may be used by the MOEA system 130 for evaluating solutions according to the multiple objectives and determining constraints of solutions (e.g., infeasible solutions), respectively. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints that may be navigated in the constraint optimization mechanism. For example, with pricing optimization problems, the objective model(s) may be used to evaluate the total number of sales of a particular item at a particular price point.

As shown, the result of optimization based on the input parameters 110 and by using the models 120, outputs 140 may be generated by the MOEA system 130. The outputs 140 may be one or more variables that are optimized in accordance with the models 120 by the MOEA system 130. For example, in a pricing optimization problem, the outputs may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. This is by way of example only and it will be appreciated that, in example embodiments, there may be more than four elements to be priced. For example, a world-wide hotel chain may wish to price its rental rooms across all of its worldwide properties. In such an example, constraints may arise from the hotel chain, at least in the short run, having a fixed number of hotel rooms. As another example, an airline may wish to price all flights that it has on its network (e.g., 2000 daily sorties), including multi-leg flights. In such an example, constraints may arise from the airline, at least in the short run, having a fixed number of available seats for each seating class between any two cities. As yet another example, a consumer electronics company may wish to price its entire range of notebook computers, table computers, and smartphones with various trims and options. In such an example, constraints may arise from the consumer electronics company, at least in the short run, having a fixed manufacturing capacity across its line of products in shared manufacturing assets (e.g., factories).

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOEA system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

In example embodiments, the output 140 may also include a variety of derivative outputs associated with the collection of pareto-optimized solutions or a single optimized solution. These derivative outputs may be an expected progression of metrics associated with an optimized solution. For example, the optimized solution may be for pricing of airline tickets (e.g., decision variables) and the derivative output (e.g., expected metrics) may be of the percentage of seats sold as a function of days till the flight. Thus, this derivative output of an expected metric may be used by the IROP system 150 for comparison to live data that may be received by the IROP system 150. Derived outputs, in example embodiments, may particularly be provided by the MOEA system 130, when the IROP system 150 is to use non-decision variable data in identifying an irregular operation.

The IROP system 150, in example embodiments, may be configured to receive the outputs 140 and/or other information from the MOEA system 130. The IROP system 150 may further be configured to receive one or more live data, such as real-time or near real-time data of the operations of the optimized entity from one or more systems configured to provide the live data (e.g., monitoring systems, logging systems, sensor(s), sensor systems, etc.). The IROP system 150 may be configured to compare the live data 160, as received from the output 140, and particularly to one or more tracking metrics and expected progression thereof. The IROP system 150 may further be configured to compare differences in the expected metrics and the live data and compare the differences to a threshold to determine if the differences trigger a threshold condition. The threshold condition may indicate that a new baseline of operation is to be implemented based at least in part on a new and updated optimization. In some example embodiments, meeting the threshold condition may result in performing a re-optimization. In other example embodiments, meeting the threshold condition may result in selecting from a re-optimization that had been performed by the MOEA system 130 in a continuous and/or periodic fashion.

Figure 2:
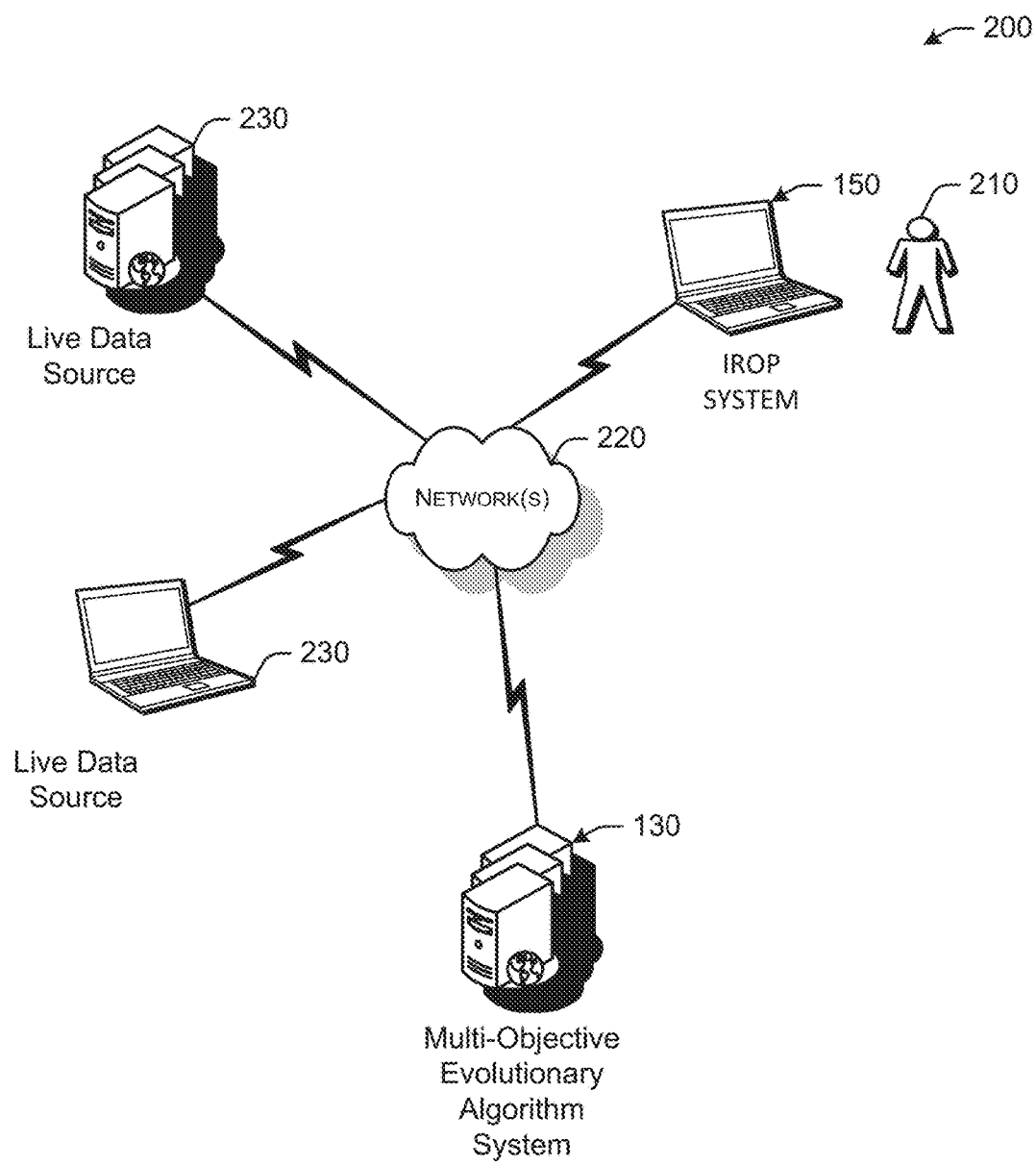
FIG. 2 is a schematic diagram that illustrates an example environment with the MOEA system and the IROP system of FIG. 1, in accordance with example embodiments of the disclosure.

FIG. 2 is a schematic diagram that illustrates an example environment 200 with the MOEA system 130 and the IROP system 150 of FIG. 1, in accordance with example embodiments of the disclosure. The example environment 200 may further include a network 220 and one or more live data sources 230.

The network(s) 220 may include any one or a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

In some example embodiments, the MOEA System 130 and the IROP system 150 may be co-located. In other example embodiments, the IROP system 150 may be located in a location separate from the MOEA system 130. For example, in example embodiments, the MOEA system may be a multi-core, massively parallel processing, mainframe, and/or a super-computer that may be located in a particular location and accessed by the IROP system 150, via the network(s) 220, from a customer location. In other example embodiments, the IROP system 150 may be co-located with the MOEA system 130.

In example embodiments, there may be a variety of sources 230 of live or near-live data. These live data source(s) 230 may be co-located with the IROP system 150 in some example embodiments. In other example embodiments, the live data source(s) 230 may be located remotely from the IROP system 150. In yet other example embodiments, some live data source(s) 230 may be co-located with the IROP system 150 and other of the live data source(s) 230 may be located remotely to the IROP system 150. The IROP system 150 may be configured to receive any variety of live data from the live data source(s) 230 including, but not limited to, sensor data, logging data, narrative messages, tracking data, temporal data, spatial data, monetary data, parameter measurements, combinations thereof, or the like.

In a non-limiting example, there may be a live data source 230 at various airports served by an airline network, where each of the live data source(s) 230 may be reporting timeliness of flights departing from that airport to a centrally located IROP system 150. In another non-limiting example, there may be a plurality of live data source(s) 230 distributed throughout a factory and reporting manufacturing parameters and/or measurements to a central IROP system 150. It will be appreciated therefore, that the live data source(s) 230 may be captive sources or distributed sources and the data therefrom may be received by any suitable mechanism by the IROP system 150, such as via the network(s) 220.

In example embodiments, the IROP system 150 may be any suitable user device including, but not limited to, a mobile phone, a smartphone, a tablet computing device, an electronic book (ebook) reader, wearable devices, smart watches, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like.

The IROP system 150 may be configured to receive an initial optimization and/or current optimization from the MOEA system 130 and/or a variety of parameters associated with the initial and/or current optimization. The IROP system 150 may be configured to display and/or communicate the initial optimization to an operator 210 and/or a group of operators 210. In other example embodiments, separate systems may exist for displaying the initial optimization to the operator 210. In example embodiments, the IROP system 150 may be configured to physically initiate or help initiate the initial optimization and/or any subsequent re-optimization.

The IROP system 150 may further be configured to receive live data (e.g., real-time data or near real-time data) from a variety of live data source(s) 230. The IROP system 150, in example embodiments, may be configured to store and/or manage the received live data, such as by storing it in memory and/or storage devices of the IROP system 150. In some example embodiments, the IROP system 150 may further be configured to determine one or more aggregate metrics and/or parameters associated the live data received by the IROP system 150. The aggregate metrics and/or parameters, therefore, may be a function of or some other combination of the received live data. For example, throughput of factory equipment may be combined and/or averaged to generate an aggregate metric that may be used for the purposes identifying an irregular operation, such as one where a new baseline is to be implemented. In some example embodiments, live data, such as from various live data feeds, may be combined with expected data to generate a parameter that may be thresholded to identify an irregular operation. For example, in the airline scheduling example, live data of departure times of flights may be received from live data sources 230 at each airport. The IROP system 150 may be configured to compare the live data for each airport to expectations of that live data and generate an aggregate delay parameter for that airport. The aggregate delay may be the delay from all flights flown compared to their respective expected departure times summed over time. If that aggregate delay triggers a threshold condition, an irregular operation may be identified for that airport or system-wide.

The IROP system 150 in some example embodiments, may operate in a manner where the MOEA system 130 may continuously be performing re-optimizations as live data is received by the IROP system 150. When the IROP system 150 identifies an irregular operation, it may be configured to identify the latest (e.g., most recent) optimization performed by the MOEA system 130. In example embodiments, the most recent optimization performed for the elements being optimized may be based on the latest live data available. In this way, the MOEA system 130 may receive, either directly or via the IROP system 150, the latest live data that may be used for re-optimization. In example embodiments, events that have transpired may already be frozen out in these re-optimizations. The decision variables to be frozen out, in example embodiments, may be provided by the IROP system 150 to the MOEA system 130. Furthermore, in example embodiments, the re-optimizations, as performed by the MOEA system 130, such as in a periodic or continuous manner may use a reduced set of decisions variables and/or reduce set of objectives. The parameters for the re-optimizations (e.g., decision variables, objectives, box sizes, stopping criteria, etc.) may be provided, in example embodiments in accordance with the disclosure, to the MOEA system 130 by the IROP system 150.

When IROP system 150 does identify an irregular operation, the IROP system may receive and/or request, or otherwise obtain, results from the most recent re-optimization form the MOEA system 130. The received re-optimization may include one or more pareto-optimized solutions. In some example embodiments, the IROP system 130 may be configured to automatically select, such as based on one or more pre-defined intended outcomes, implement a re-optimized solution. In other example embodiments, the IROP system 130 may be configured to provide two or more pareto-optimized solutions to an operator 210 for the purposes of selecting a particular solution for optimization. For example, in the airline example, the IROP system may identify that there are anomalous flight delays for flights leaving Boston, Mass. Such delays may be due to weather activity in the affected airport. The re-optimization system may provide options along the pareto-optimized front of solutions that may include re-routing some Boston flights through Providence, R.I. or through Manchester, N.H. The IROP system 150 may, in this case, provide both of these options to the operator 210 for selection prior to implementation of one of these options.

Figure 3:
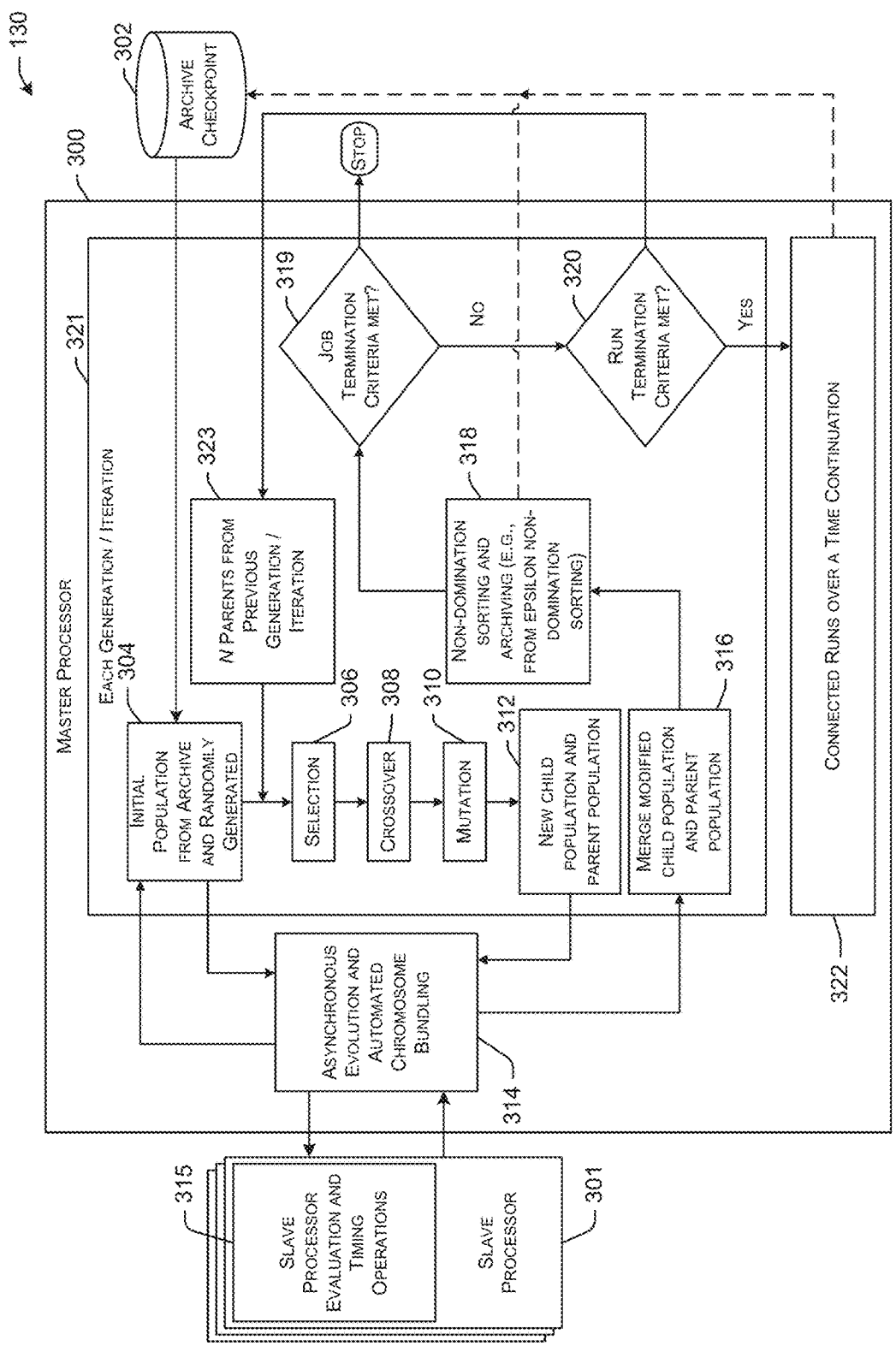
FIG. 3 is a block diagram that illustrates the example MOEA system of FIG. 1, in accordance with example embodiments of the disclosure.

In other example embodiments, the MOEA system 130 may not continuously and/or periodically be generating updated re-optimized solutions. In these example embodiments, the IROP system 150 may be configured to compare expected data (e.g., optimized solution decision variables, derived parameters, metrics, etc.) to live data to determine if a threshold condition indicating an irregular operation has been reached. If an irregular operation is determined to have occurred, then the IROP system 150 may initiate the MOEA system 130 to perform a re-optimization and provide one or more pareto-optimized solutions. The IROP system 150, when requesting the re-optimization from the MOEA system 130, may provide the FIG. 3 is a block diagram that illustrates the example MOEA system 130 of FIG. 1, in accordance with example embodiments of the disclosure. In some example embodiments, the MOEA system 130 may be an evolutionary algorithm system, such as those described in at least U.S. Pat. Nos. 8,255,344 and 8,285,653, both of which are incorporated herein, in their entirety by reference.

The evolutionary algorithm system may employ techniques of biologic natural selection to efficiently search a multi-objective optimization space that may not be amenable to search by analytic, iterative, or other methods. In example embodiments, the search variables or decision variable, such as the prices of various items in a pricing problem, may be organized as a data structure that resembles genes in a chromosome or data elements in a data array. In example embodiments, the decision variables of the optimization problem (e.g., pricing problem) may be organized as an allocation of variables that are to be optimized according to the multiple objectives of the optimization problem. In other words, the solution may be represented as a data structure having the various decision variables. In some example embodiments, the solutions may be organized as chromosomes with genes (e.g., individual decision variables) at the MOEA system 130.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items, schedule of train departures, etc.) from any given generation, based at least in part on the corresponding respective performance on the multiple objectives that are being used to evaluate the optimization problem (e.g., pricing optimization, schedule optimization, etc.). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes selecting a relatively optimized solution set (e.g., flight times in an airline network) in accordance with the identified objectives of the optimization. When new child solutions are generated using the biological-styled processes described above, a check for feasibility may be performed. If a potential solution is not feasible, then in some example embodiments, a drive to feasibility may be performed, such as by a constraint minimization engine. In other example embodiments, potential solutions that are found to be not feasible may be eliminated from the population of solutions that are to be evaluated from a multi-objective standpoint. In yet other example embodiments, solutions that are found to be not feasible may be retained in the population to be evaluated on a multi-objective performance basis. In some of these cases, the non-feasible solutions may be retained for a limited period of time (e.g., one generation, predetermined number of generations, etc.). In the same or other cases, the non-feasible solutions may be tagged as such, so that the genetic material of the non-feasible solutions may be used to drive to more optimized solutions, without allowing the non-feasible solutions to be presented as an optimized solution.

It can be seen that the mechanisms used by the evolutionary algorithm (e.g., genetic operators, selection, crossover, mutation, etc.), particularly in the form of an multi-objective evolutionary algorithm system 130, are not mechanisms that are limited to arrive at a convergence in an iterative fashion. Indeed, the mechanism is one that employs intelligent "hopping around" and evaluating according to optimization objectives and/or constraint limitations, rather than just a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the multi-objective evolutionary algorithm system 130, as described herein. Although the multi-objective evolutionary algorithm system 130 is discussed herein, it will be appreciated that any suitable system for implementing a heuristic optimization, such as, but not limited to Monte Carlo methods, extremal optimization (EO) methods, etc. may be implemented in accordance with example embodiments of the disclosure.

In this example embodiment, the MOEA system 130 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein. In some example embodiments, the constraint and/or objective evaluation may be implemented on the slave processor(s) 301, while the objective optimization engine may be implemented on the master processor 300.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., an initial set of prices that may be allocated to one or more hotel room types (items)). In other words, the initial population may represent a starting point, such as a best guess or a set of parameters that may represent the current implementation prior to the benefits of the optimization(s), as described herein. In an example embodiment of the disclosure, each parent chromosome data structure (e.g., departure times in a scheduling problem, prices for items in a pricing problem, etc.) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In an example embodiment of the disclosure, the initial population of parent chromosome data structures may be obtained from a combination of the archive checkpoint 302 and random generation of new chromosome data structures. The archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system.

The archive checkpoint 302 may include an elite set of chromosome data structures (i.e., elite solutions of scheduled departure times) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 314, which allocates the chromosomes to the slave processors 301 for objective function evaluation and/or constraint function evaluation by block 315. Once the objective function evaluations evaluation in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures of launch parameters. In an example embodiment of the disclosure, the selection of the pairs of parent chromosome launch parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 306, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 308 and 310. For example, block 308 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

After the evolutionary operations of block 306, 308, and 310, a new population of child chromosome data structures (i.e. launch parameters to be evaluated) may be obtained in block 312. Following block 312, processing may proceed to block 314. In block 314, the new population of child chromosome data structures may be received into a "To Evaluate" list or queue (see also FIG. 5, which illustrates block 314 in further detail). Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. Alternatively, the slave processor 301 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 301. In some cases, the number of flags, indicating the number of genes that are permitted to be considered as deviating from the baseline solution chromosome, may be considered in the bundling process.

In block 315, each slave processor 301 may have received a chromosome bundle comprising one or more chromosome data structures from the master processor 300. Additionally, in certain embodiments, the slave processors 301 may further receive a baseline chromosome or solution organized in any manner, representing a known solution. The slave processors 301 may be homogenous or heterogeneous in processing capability. Each slave processor 301 may evaluate, in accordance with a plurality of objective functions, the received chromosome bundle of chromosome data structures, and/or the baseline solution chromosome to generate a plurality of respective objective function values for each chromosome data structure in block 315. In some example embodiments, the slave processors 301 may further perform the functions of constraint minimization. The slave processors 301, therefore, in example embodiments, receive a solution to be both constraint minimization driving, in addition to objective value determination. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values) and timing data (e.g., wait times and/or objective function evaluation times) to the master processor 300. The slave processor 301 may further receive, in example embodiments, a constraint violated solution and return a constraint non-violated solution to the master processor 300. As a result, the constraint minimization engine may be implemented on the slave processors 301 in accordance with example embodiments. In some of these example embodiments, the slave processors 301 may further provide objective values, as determined using the objective models 120, along with the non-constraint solutions. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In block 316, the master processor 300 may receive a modified child population of chromosome data structures from the asynchronous evolution process of block 314. In certain embodiments, the modified child population may include different chromosome structures as well as a different number of chromosome data structures as compared to the child population of block 312. The received modified child population is merged with the current parent population, as illustrated by block 316. In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.
Condition 2: The solution $x_1$ is strictly better than $x_2$ in at least one objective.

If both conditions 1 and 2 are satisfied, then all of the following statements are substantially equivalent:

$x_2$ is dominated by $x_1$,
$x_1$ is non-dominated by $x_2$, or
$x_1$ is non-inferior to $x_2$.

Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank.

In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 302 or another archive of a computer memory or other data storage for subsequent retrieval. At this point, the solutions (e.g., chromosomes), as stored in the checkpoint 302, may be generated based at least in part on both objective function based evaluation and constraint minimization based evaluation.

Following processing in block 318, processing may proceed to block 319. In block 319, a determination is made as to whether the current job is completed such that the evolutionary algorithm should be terminated. A job typically comprises processing involving a plurality of connected runs 322, where each run 322 may include processing associated with one or more generations/iterations 321. Block 319 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 319 determines that the job is not complete, then processing may proceed to block 320 to determine whether the current run 322 has completed. In determining whether the current run is complete, block 320 may determine whether a current run 322 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 320 determines that a current run 322 is not complete, then processing may proceed to block 323, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 320 may determine that a current run 322 is complete. For example, looking back over a predetermined number of generations, the search may have failed to produce improvement in the solutions during each generation/iteration 321 of the current run 322. Improvement may be based upon the quantity of the solutions (e.g., the number of solutions) and the quality of the solutions (e.g., some quantification of distance from a utopia point, box fitness, etc.). In this case, the current run 322 may be completed, and processing proceeds to initiate a subsequent run 322. The subsequent run 322 may generate an initial population by invigorating the elite solutions stored in the archive checkpoint 302. In particular, the subsequent run 322 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. In example embodiments, the elite solutions may be non-constrained. The randomly generated parent chromosome data structures may be generated and evaluated using the example processes discussed with respect to blocks 304 and 314.

In some example embodiments, the processors 300, 301 of the MOEA system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-tiered optimization system 130 may also include a chipset (not shown) for controlling communication between the one or more processors 300, 301 and one or more of the other components of the s multi-tiered optimization system 130. The one or more processors 300, 301 may also include one or more application specific integrated circuits (ASICs) or application specific standard products (ASSPs) for handling specific data processing functions or tasks. In example embodiments, the MOEA system 130 may further include input/output (I/O) device(s) such as display screen(s), touch sensitive display screen(s), speaker(s), haptic device(s), or the like, may be controlled via one or more I/O device interfaces.

The MOEA system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the MOEA system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
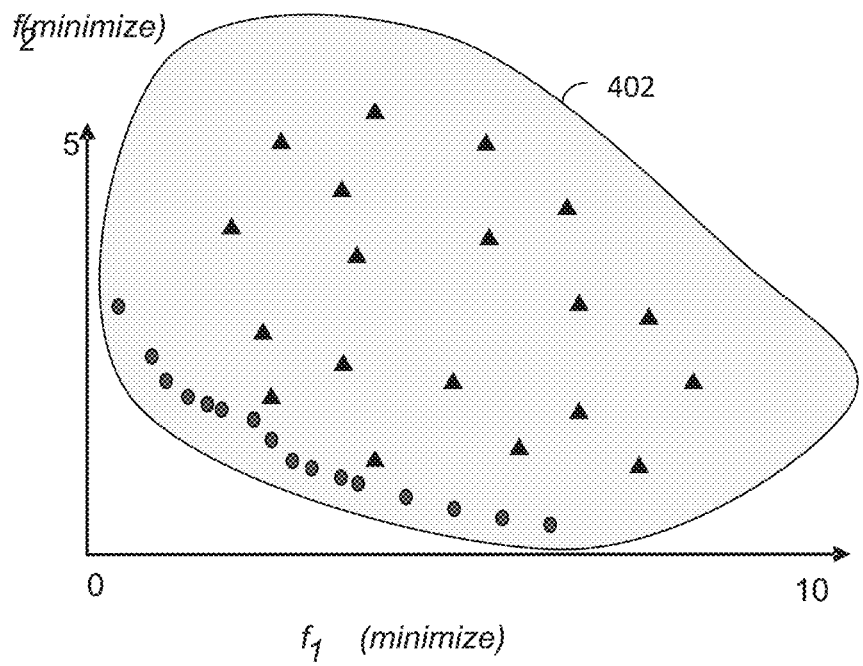
FIGS. 4A and 4B are charts illustrating an example pareto-optimized solution to a multi-objective problem, in accordance with example embodiments of the disclosure.
Figure 4B:
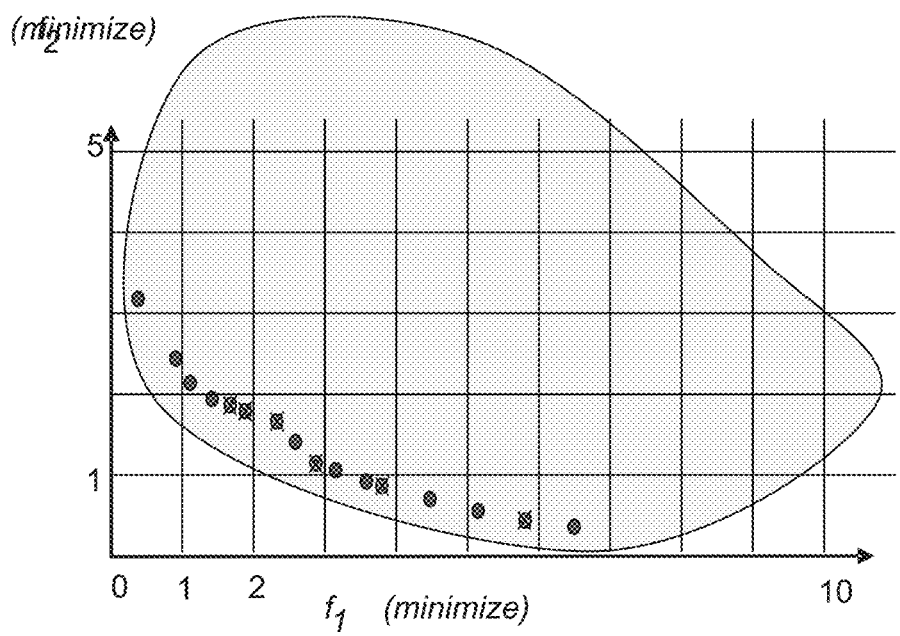

FIGS. 4A and 4B are charts illustrating an example pareto-optimized solution to a multi-objective problem, in accordance with embodiments of the disclosure. Initially, a first non-domination sorting may be applied to the current population 402 to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function $f_1$, and a second epsilon value may be associated with second epsilon spacing or step size $\varepsilon_2$ associated with objective function $f_2$. Each solution may then be associated with an epsilon vector or epsilon box address ($\varepsilon_1$, $\varepsilon_2$) corresponding to the first epsilon value and the second epsilon value. If two or more solutions have the same epsilon box address, then the epsilon non-domination sorting may retain a single solution per epsilon box address ($\varepsilon_1$, $\varepsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region 402 associated with a first objective function $f_1$ and a second objective function $f_2$. Within the feasible design region is a snapshot of a population of solutions of a given generation/iteration, according to an example embodiment of the invention. Solutions in the feasible region 402 may be found by the constraint minimization techniques. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 5:
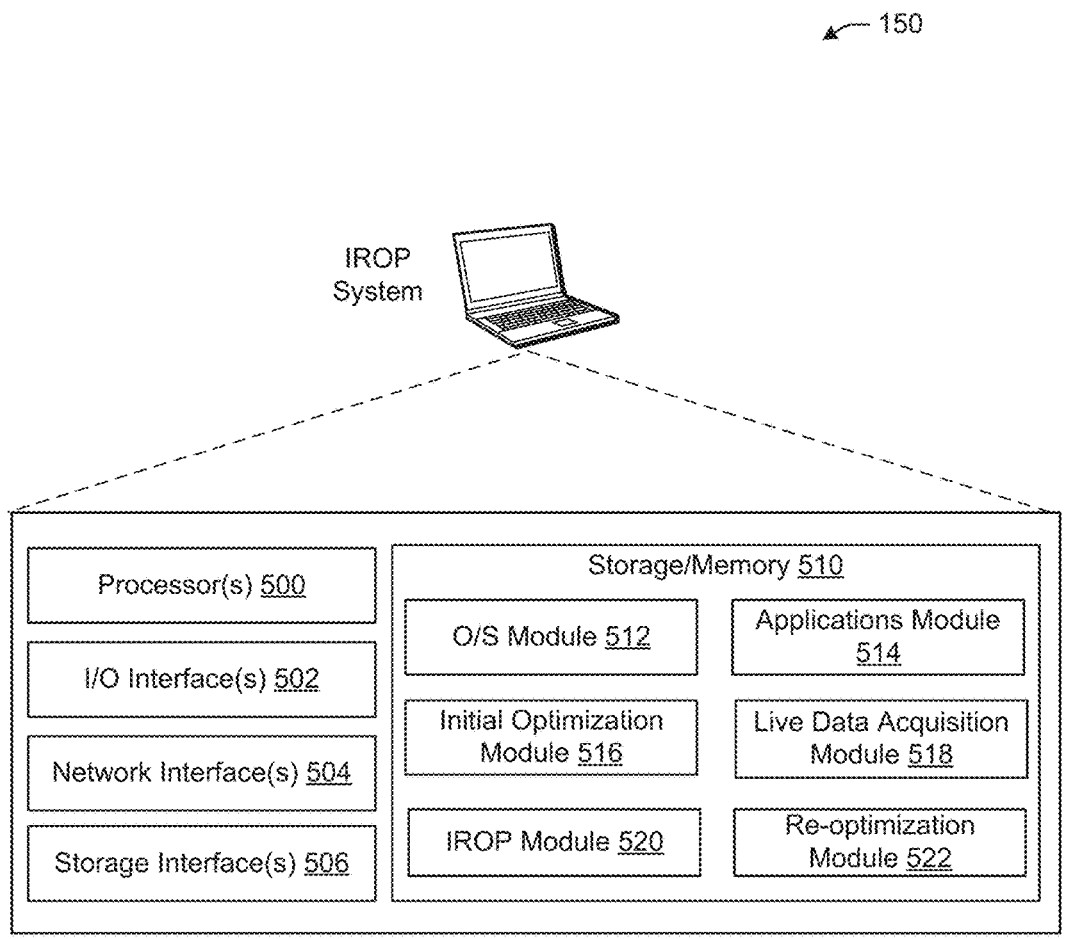
FIG. 5 is a block diagram that illustrates the example IROP system of FIGS. 1 and 2, in accordance with example embodiments of the disclosure.

FIG. 5 is a block diagram that illustrates the example IROP system 150 of FIGS. 1 and 2, in accordance with example embodiments of the disclosure. The IROP system 150 may include one or more one or more processor(s) 500, one or more input/output (I/O) interface(s) 502, one or more network interface(s) 504, one or more storage interface(s) 506, and one or more storage or memories 510.

In some examples, the processor(s) 500 of the IROP system 150 may be implemented as appropriate in hardware, software, firmware, or combinations thereof. Software or firmware implementations of the processors 500 may include computer-executable or machine-executable instructions written in any suitable programming language to perform the various functions described. Hardware implementations of the processors 500 may be configured to execute computer-executable or machine-executable instructions to perform the various functions described. The one or more processor(s) 500 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The IROP system 150 may also include a chipset (not shown) for controlling communications between the one or more processor(s) 500 and one or more of the other components of the IROP system 150. The one or more processor(s) 500 may also include one or more application specific integrated circuits (ASICs) or application specific standard products (ASSPs) for handling specific data processing functions or tasks.

The I/O interface(s) 502 may enable the IROP system 150 to receive and/or provide input and/or output from/to one or more user interface(s). Some example user interface(s) may include touch sensitive screens, buttons, switches, microphones, speakers, haptic devices/vibrators, mice, keyboards, combinations thereof, or the like. The user interface(s) may be configured to interact with the processor(s) 500 enabled by the I/O interface(s) 502 of the IROP system 150. The network interfaces(s) 504 may allow the advertisement IROP system 150 to communicate via one or more network(s) 220 and/or via any other suitable communicative links. The storage interface(s) 506 may enable the IROP system 150 and the processor(s) 500 thereon to access, read, and write to the storage/memory 510 and/or other external storage devices and/or databases.

The storage/memory 510 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 510 may store program instructions that are loadable and executable on the processor(s) 500, as well as data generated or received during the execution of these programs. Turning to the contents of the storage/memory 510 in more detail, the storage/memory 510 may include one or more operating systems (O/S) 512, an application(s) module 514, an initial optimization module 516, a live data acquisition module 518, an IROP module 520, and a re-optimization module 522. Each of the modules and/or software may provide functionality for the IROP system 150, when executed by the processor(s) 500. The modules and/or the software may or may not correspond to physical locations and/or addresses in storage/memory 510. In other words, the contents of each of the modules 512, 514, 516, 518, 520, 522 may not be segregated from each other and may, in fact be stored in at least partially interleaved positions on the storage/memory 510.

The O/S module 512 may have one or more operating systems stored thereon. The processor(s) 500 may be configured to access and execute one or more operating systems stored in the (O/S) module 512 to operate the system functions of the IROP system 150. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application module 514 may contain instructions and/or applications thereon that may be executed by the processor(s) 500 to provide one or more services to a user of the IROP system 150. These instructions and/or applications may, in certain aspects, interact with the operating system module 512 and/or other modules of the IROP system 150. The applications module 514 may include instructions and/or applications therein that when executed by processor(s) 500 enable the IROP system 150 to perform a variety of functions that may be desired by the user of the IROP system 150. These applications may enable the rendering of content on the IROP system 150, performing calculations, word processing, spread sheet, database functions, engineering functions, external device control, communications functionality, navigation functions, social networking, biometric monitoring, content generation, calculations, or any other suitable functions. The applications and certain embodiments may control one or more input/output devices such as touch panels, displays, microphones, sensors or speakers of the IROP system 150.

The processor(s) 500, by executing instructions stored in the initial optimization module 516, may be configured to direct an initial optimization of the processes for which an optimization is desired. The processor(s) 500 may be configured, in example embodiments, to receive indication(s) of one or more parameters, one or more constraints, and/or one or more objectives. In example embodiments, the IROP system 150 may be configured to receive these indications from an operator 210, such as via one or more I/O devices operational via the I/O interface(s) 504. In the same or other example embodiments, the processor(s) 500 may be configured to receive the indication(s) of one or more parameters, one or more constraints, and/or one or more objectives via one or more input file(s) specifying each of the aforementioned items. Indeed, in example embodiments, input file(s) may specify such elements as constraint models, objective models, decision variables, additional parameters to be returned with an optimized solution, combinations thereof, or the like. In example embodiments, the processor(s) 500, by executing instructions stored in the initial optimization module 516 may be configured to provide information such as one or more parameters, one or more constraints, and/or one or more objectives to the MOEA system 130 for performing an initial optimization be performing the processes discussed in conjunction with FIG. 3.

In some example embodiments, where the MOEA system 130 may be performing continuous and/or periodic re-optimizations, the processor(s) 500 may be configured to provide parameter(s) that may enable, direct, or otherwise specify the continuous and/or periodic re-optimization, and provide the same to the MOEA system 130. In example embodiments, these re-optimization parameters may be received by the processor(s) 500, such as via operator 210 input to the IROP system 150. Such parameters, for example, may include a periodicity for re-optimization, number of core(s) to be used for the re-optimization, memory allocation for the re-optimization, constraints for the re-optimization, decision variables for the re-optimization, specification of vectors for identifying decision variables to freeze out, optimization objective(s) for the re-optimization, combinations thereof, or the like.

In other example embodiments, the IROP system 150 and the processor(s) 500 thereon may not be involved in instantiating the initial optimization. Instead, in these example embodiments, operator(s) 210 may interact directly with the MOEA system 130 to initiate an initial optimization.

In example embodiments, the processor(s) 500, by executing instructions stored in the initial optimization module, may be configured to receive an initial optimized solution to the processes that are desired to be optimized. The processor(s) 500 may further be configured, in some example embodiments, to receive on or more parameters and/or metrics that may be expected if the optimized solution is implemented. These parameters and/or metrics may be derived values associated with the decision variables that are optimized in the received optimized solution. For example, in a pricing problem of pricing various types of hotel rooms, additional parameters, as provided by the MOEA system 130 along with the optimized solution, may include a progression of the rental of particular hotel rooms as a function of time until occupancy. It will be appreciated that such a parameter may be used for comparison with live data that may be received by the processor(s) 500. In some cases, the derived parameters may be generated by the MOEA system 130 using one or more of the optimization models and/or other models that may be available to the MOEA system 130. In other cases, the IROP system 150 and the processor(s) 500 thereon may be configured to determine the derived parameters and/or metrics for comparison to live data using the received optimized decision variables, as received from the MOEA system 130 as an optimized solution.

In some example embodiments, the processor(s) 500 may not be configured to receive additional and/or derived parameters along with the optimized solution. In these case, the IROP system 150 and the processor(s) 500 thereon may be configured to either generate a derived parameter for comparison to live data or compare the optimized decision variables to received live data. As a non-limiting example of comparing optimized decision variables to live data, in a scheduling problem of airline flights in an airline network, the processor(s) 500 may be configured to receive optimized departure times of each flight in the network. The processor(s) 500 using live data, may be configured to compare actual departure times of flights to the optimized departure times, as would be expected of the flights when the optimized solution is implemented. In this case, since the decision variables are the optimized departure times themselves, the comparison by the processor(s) 500 may be to compare live data to the decision variables, as optimized in the multi-objective optimization (initial or re-optimization subsequent to initial).

The processor(s) 500, by executing instructions stored in the live data acquisition module 518, may be configured to receive and/or organize live data from any variety of sources, such live data sources 230. In example embodiments, the live data may be real-time or near real-time data that may be received as any variety of sensor data, logging data, narrative messages, tracking data, temporal data, spatial data, monetary data, parameter measurements, combinations thereof, or the like. The processor(s) 500 may be further configured to store and/or log the live data, such as in the storage/memory 510 or other suitable storage device(s). The processor(s) 500, by executing the instructions stored in the live data module, may still further be configured to make the live data, as received by the processor(s) 500, available to other processes performed by the processor(s) 500, such as processes involving comparing the received live data to an expected progression of that live data.

The processor(s) 500, by executing instructions stored in the irregular operations (IROP) module 520, may be configured to compare received live data to the expected progression of that live data to determine if a threshold condition is reached. In some cases, as discussed above, the live data may correspond to the optimized decision variables of the optimized solutions themselves (e.g., comparing departure times of flights to an optimized set of target departure times). In other cases, the live data may be correspond to a derived parameter that may be based on the optimized decision variables, but are not the decision variables themselves (e.g., comparing a factory process yield that is expected by running a process equipment with an optimized set of operational parameters, where the optimized set of operational parameters are the decision variables and the process yield is a derived parameter based on the optimized decision variables). Upon comparing the live data to expected parameters/data, the processor(s) 500 may be configured to determine is an irregular operation exists. In example embodiments, if the difference between one or more or a combination of live data to expectations thereof are great enough (e.g., at or beyond a threshold level), then the processor(s) 500 may be configured to determine that an irregular operation exists. For example, the threshold condition may be that a particular tracking metric exceeds or is lower than a corresponding threshold value, or a majority of tracking metrics exceed or are lower than corresponding threshold values, or that a linear combination of a group of parameters exceed or are lower than a corresponding threshold value.

In one non-limiting example, the processor(s) 500 may be configured to receive departure time data corresponding to flights at various airports. The processor(s) 500 may further be configured to determine accumulated delays at each airport by determining a running summation of delays of each flight relative to their expected departure time at each of the airports being monitored. If any of the accumulated delays at any of the airports reach a threshold level, the IROP system 150 and the processor(s) 500 thereon may be configured to declare an irregular operation at that airport. Any type of re-optimization may take into account the delays at an airport that may be operating in an anomalous way.

The processor(s) 500, by executing instructions stored in the re-optimization module 522, may be configured to either instantiate a re-optimization and or select and/or present one or more fresh re-optimization solutions for implementation upon detecting an anomaly or irregular operation. In some example embodiments, the processor(s) 500, upon identifying an irregular operation, may be configured to request the MOEA system 130 to perform a re-optimization based at least in part on the latest live data. In some cases, the IROP system 150 and the processor(s) 500 thereon may be configured to receive more than one re-optimized solution (e.g., non-dominated solutions along a pareto-front) responsive to requesting a re-optimization after detecting an irregular operation. In this case, the processor(s) 500 may be configured to make a determination of which among the more than one solutions to implement. In other example embodiments, the processor(s) 500 may be configured to present to an operator 210 two or more re-optimization choices of pareto-optimized solutions from which to choose a single optimized solution for implementation. Upon a selection by the operator 210, the processor(s) 500 may be configured to implement and/or initiate implementation of the selected optimized solution. In some cases, this may entail the processor(s) 500 being configured to communicate one or more parameters of the selected re-optimized solution to one or more entities that may implement aspects of the solution (e.g., flight scheduling computers, hotel room sales computers, production engineers, etc.).

In some other example embodiments, where the MOEA system 130 is configured to continuously and/or periodically perform a re-optimization based on live data, the processor(s) 500, upon identifying an irregular operation, may be configured to receive the latest re-optimized solution(s) from the MOEA system 130. In some cases, the processor(s) 500 may be configured to continuously receive re-optimized solution(s) (e.g., non-dominated solutions along a pareto-front) as the MOEA system 130 performs the re-optimizations. In other cases, the processor(s) 500 may request, from the MOEA system 130, the latest re-optimization, as performed by the MOEA system 130. In some cases, the IROP system 150 and the processor(s) 500 thereon may be configured to identify more than one re-optimized solution (e.g., non-dominated solutions along a pareto-front) in the latest re-optimization. In this case, the processor(s) 500 may be configured to make a determination of which among the more than one solutions to implement. In other example embodiments, the processor(s) 500 may be configured to present to an operator 210 two or more re-optimization choices of pareto-optimized solutions of the re-optimization from which to choose a single optimized solution for implementation. Upon a selection by the operator 210, the processor(s) 500 may be configured to implement and/or initiate implementation of the selected optimized solution. In some cases, this may entail the processor(s) 500 being configured to communicate one or more parameters of the selected re-optimized solution to one or more entities that may implement aspects of the solution (e.g., flight scheduling computers, hotel room sales computers, production engineers, etc.).

It will be appreciated that there may be overlap in the functionality of the instructions stored in the one or more operating systems (O/S) module 512, the application(s) module 514, the initial optimization module 516, the live data acquisition module 518, the IROP module 520, and the re-optimization module 522. In fact, the functions of the aforementioned modules 512, 514, 516, 518, 520, 522 may interact and cooperate seamlessly under the framework of the IROP system 150. Indeed, each of the functions described for any of the modules 512, 514, 516, 518, 520, 522 may be stored in any module 512, 514, 516, 518, 520, 522 in accordance with certain example embodiments of the disclosure. Further, in certain example embodiments, there may be one single module that includes the instructions, programs, and/or applications described within the operating systems (O/S) module 512, the application(s) module 514, the initial optimization module 516, the live data acquisition module 518, the IROP module 520, and the re-optimization module 522.

Figure 6:
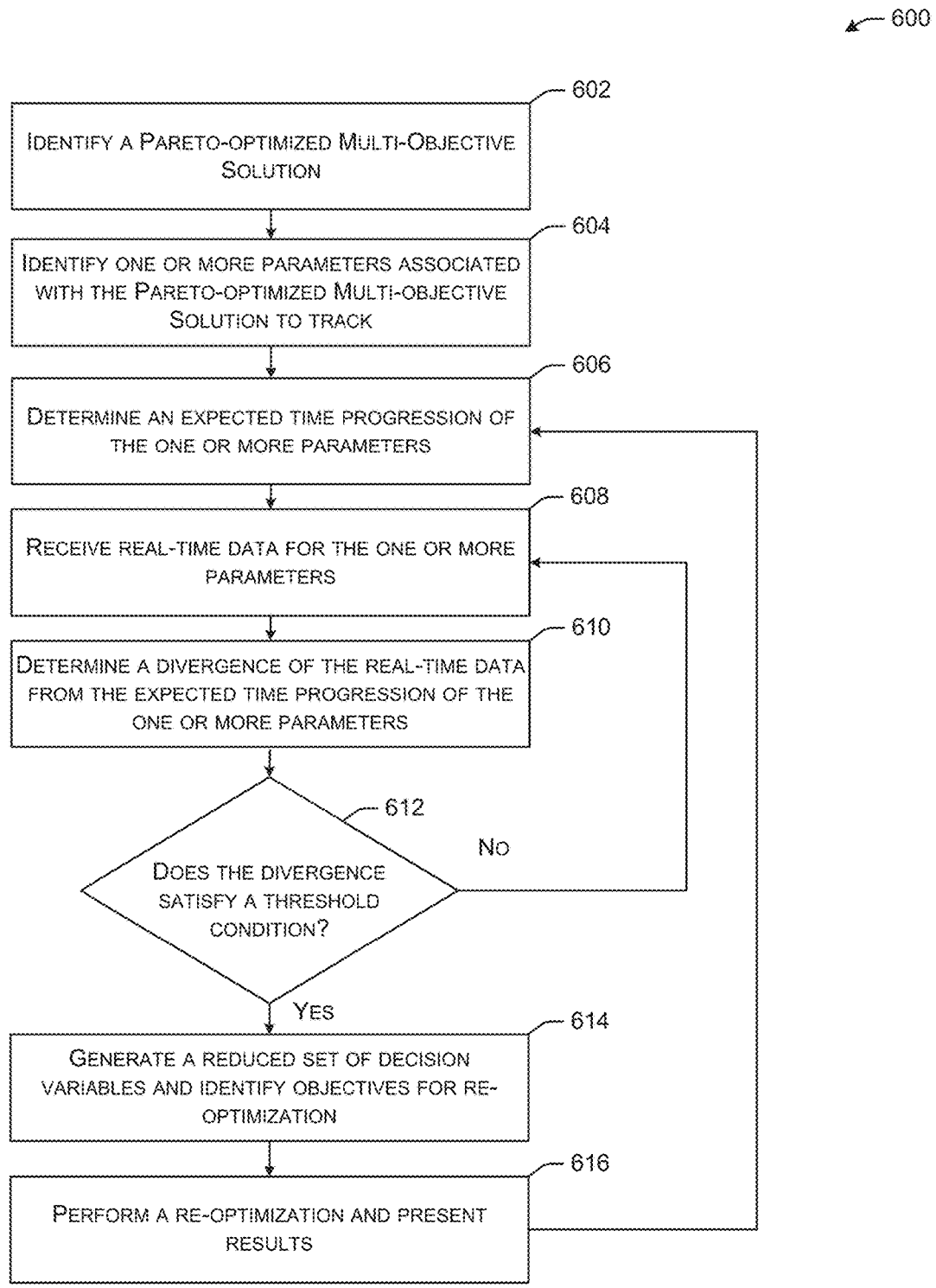
FIG. 6 is a flow diagram that illustrates an example method of identifying an anomaly and performing a re-optimization, in accordance with example embodiments of the disclosure.

FIG. 6 is a flow diagram that illustrates an example method 600 of identifying an anomaly and performing a re-optimization, in accordance with example embodiments of the disclosure. This method 600, in example embodiments, may be performed cooperatively by the IROP system 150 and the MOEA system 130, both of which are described above.

At block 602 a pareto-optimized multi-objective solution may be identified. This solution may be optimized by the MOEA system 130. In some cases, the input parameters 110 for performing this optimization may be received from the IROP system 150, such as in the form of one or more input files. Such input parameters 110 may include the constraint models, the multi-objective models, the decision variables, parameters associated with continuous or periodic re-optimization and/or indications of derived metrics to be provided along with the optimized solution. In other example embodiments, the MOEA system may perform the pareto-optimized multi-objective solution independent of the IROP system 150.

At block 604, one or more parameters associated with the pareto-optimized multi-objective solution may be identified for tracking. This tracking parameter may be one for which an expected time progression may be generated by the MOEA system 130. In some cases, this tracking parameter may be one or more decision variables that are optimized in the multi-objective optimizations. In other cases, the tracking parameter may be derived from, related to, or otherwise a function of one or more of the decision variables of the optimization.

At block 606, an expected time progression of the one or more parameters may be determined. The time progression of the one or more parameters may be determined either by the MOEA system 130 and/or the IROP system 150. In some cases, the progression may just be the tracking parameters themselves. For example, with optimizing train schedules, the tracking parameters may just be the departure times of each train from each of the stations of the rail network. In other cases, the tracking parameter may be derived from the decision variables. For example, in some cases, the tracking parameters may include a predicted time progression of bookings/reservations of hotel rooms for which prices have been optimized.

At block 608, real-time data for the one or more parameters may be received. Regardless of whether the tracking parameters are decision variables themselves or derived of the decision variables, live data associated with the tracking parameters may be received, such as from the live data sources 230. This live data may be values of the tracking parameters themselves (e.g., percentage reservations of a particular hotel room) or data that can be used to derive the tracking parameters (number of the particular hotel room that has been reserved in the last day). In some cases, live data may be logged to assist in deriving the tracking parameters at the IROP system 150.

At block 610, a divergence or difference between the real-time data from the expected time progression of the one or more parameters may be determined. This difference may be tracked as a function of time. The IROP system 150, in example embodiments, may be configured to generate charts and/or tables to display the difference between the live data and the predictions of the same from the multi-objective optimization.

At block 612, it may be determined if the divergence satisfies a threshold condition. If, at block 612, it is determined that the divergence does not satisfy a threshold condition, then the method 600 may return to block 608 where further real-time data may be received for the purposes of comparison to expected values of the data. If, however, at block 612, it is determined that the divergence does indeed satisfy a threshold condition, then at block 614, a reduced set of decision variables may be generated and objectives for re-optimization may be identified.

At block 616, a re-optimization may be performed and the results may be presented. The re-optimization may be performed with the reduced set of decision variables as provided by the processes of block 614. In example embodiments, some of the original (e.g., for the initial optimization) decision variables may be frozen out (e.g., events associated with those decision variables already transpired). In further example embodiments, decision variables that may have the most impact in any re-optimization may be isolated and re-optimized, rather than re-optimizing a full set of decision variables.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
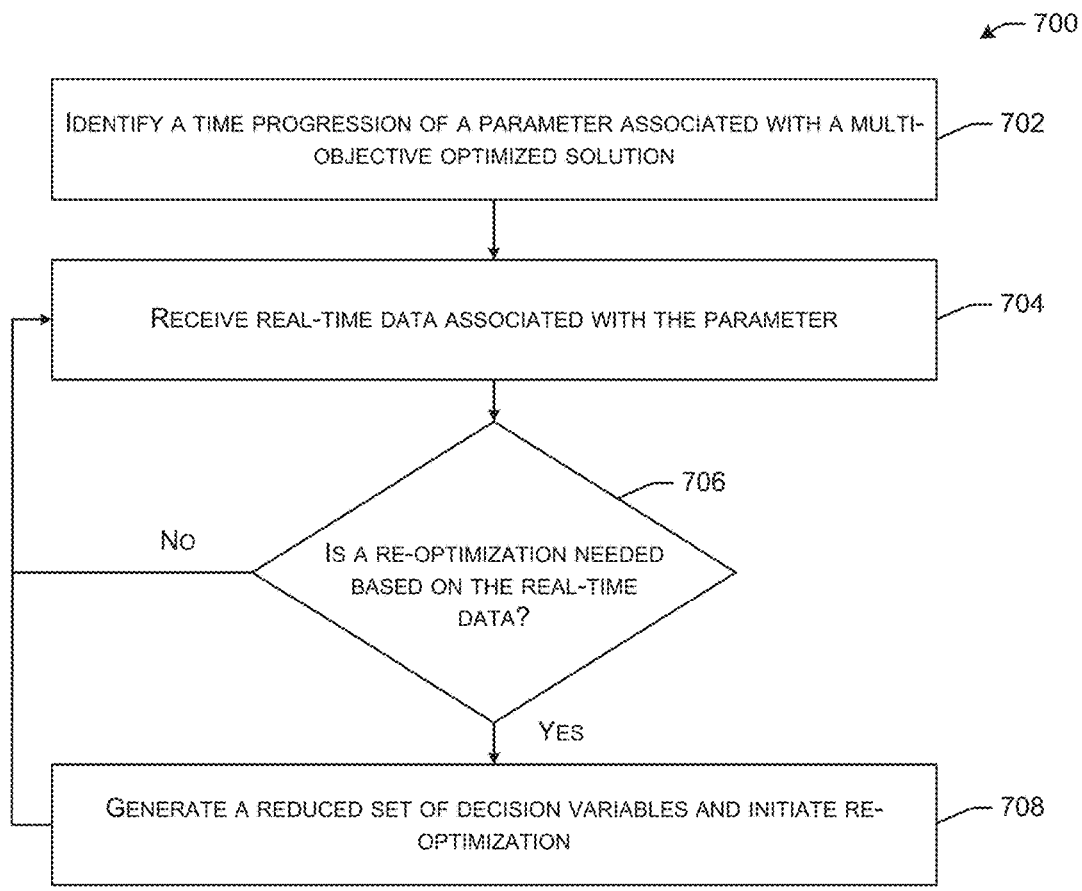
FIG. 7 is a schematic diagram that illustrates an example method of identifying an irregular operation and requesting a re-optimization, in accordance with example embodiments of the disclosure.

FIG. 7 is a schematic diagram that illustrates an example method 700 of identifying an irregular operation and requesting a re-optimization, in accordance with example embodiments of the disclosure. This method may be performed by the IROP system 150, in cooperation with one or more other systems, such as the MOEA system 130 and/or the live data source(s) 230. At block 702, a time progression of a parameter associated with a multi-objective optimized solution may be identified.

At block 704, real-time data associated with the parameter may be received. As discussed above, this data may be received from a variety of sources, such as any number of live data sources 230 that may be providing any type of suitable live data, such as operator logs, sensor data, or the like.

At block 706, it may be determined if a re-optimization is needed based at least in part on the real-time data. The determination may be made by comparing the real-time data with the expected time progression of the parameter, as received at block 702. If it is determined that a re-optimization is not needed, then the method 700 may return to block 704 to receive additional real-time data for comparison to the modeled expected data. If at block 706 it is determined that a re-optimization is needed, then at block 708, a reduced set of decision variables may be generated and re-optimization may be initiated.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
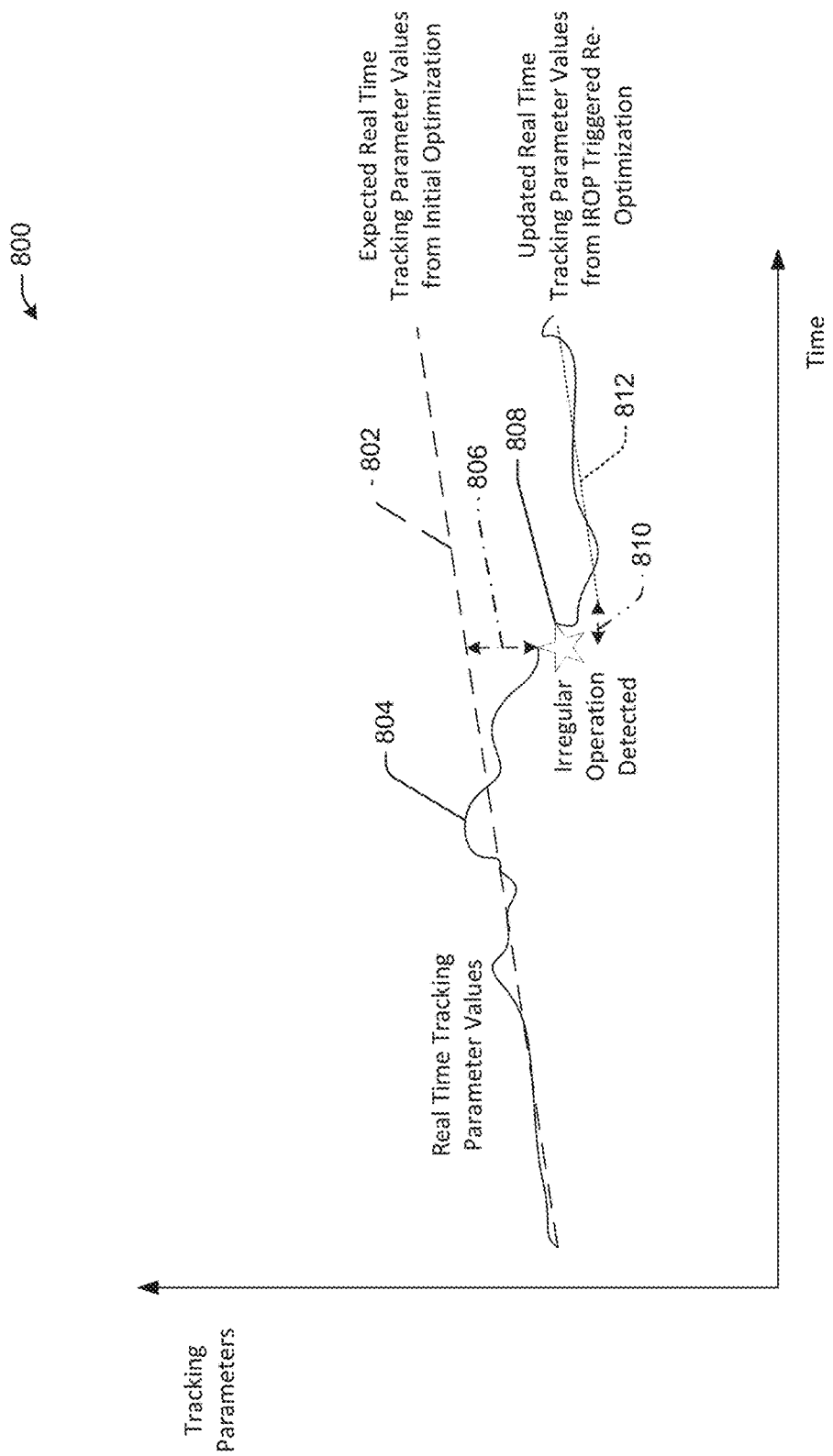
FIG. 8 is a chart that illustrates an example mechanism for identifying an irregular operation based at least in part on expected data and live data and implementing a new target optimization after the identification of the irregular operation, in accordance with example embodiments of the disclosure.

FIG. 8 is a chart 800 that illustrates an example mechanism for identifying an irregular operation based at least in part on expected data and live data and implementing a new target optimization after the identification of the irregular operation, in accordance with example embodiments of the disclosure.

The projection 802 of a tracking parameter as plotted on the chart 800 as a function of time is shown. This tracking parameter, and the projection 802 thereof, in some cases, may be a decision variable. In other cases, the tracking parameter, and the projections 802 thereof may be a combination of one or more decision variables that were optimized in a optimized solution, such as an initial optimization performed for the system to be optimized here. The live data 804 is received and shown, as plotted on the chart 800. The IROP system 150 may identify a difference between the projection or expectation 802 of the tracking parameter and the actual live data 804 during run-time. If at a certain point in time the difference between the live data 804 and the expected data 802 of the tracking parameter reaches or exceeds a threshold level 806, then the IROP system 150 may identify an irregular operation, as represented by star 808.

In some example embodiments, when the irregular operation 808 is detected, the IROP system 150 may obtain the latest re-optimization. In these example embodiments, the MOEA system 130 may be continuously and/or periodically be determining re-optimized solutions. From this latest re-optimization, the IROP system 150 may either select a new baseline 812 for operation or present one or more pareto-front optimized choices of non-dominated solutions to an operator 210 for selection as the new baseline target 812 for operation. Upon implementation of the new optimized solution 812 the IROP system 150 may compare new live data to the new baseline optimized solution 812 to determine if any further irregularities arise. Although not shown here, if further irregularities arise and are detected by the IROP system 150, then yet another baseline solution from a further re-optimization may be selected and implemented for the system being optimized (e.g. airline network).

In some other example embodiments, where the MOEA system 130 may not be continuously and/or periodically re-optimizing, the IROP system 150, in response to identifying the irregular operation 808 may initiate a re-optimization operation by the MOEA system 130. In example embodiments, the IROP system 150 may provide a reduced set of decision variables (e.g., decision variables that may not include frozen out variables and/or variables that are unlikely to change significantly) for the re-optimization operation. Furthermore, in example embodiments, the IROP system 150 may provide a different set of objectives and/or constraints (and models thereof) and/or optimization stopping criteria for the purposes of performing the re-optimization compared to the optimization performed for the current baseline operation.

Regardless of whether the MOEA system 130 performs continuous and/or periodic re-optimizations (e.g., in-situ with the operation to the current baseline) of if the re-optimization is commissioned by the IROP system 150 after detecting an irregular operation, the IROP system 150 may receive more than one pareto-front solution (e.g., more than one non-dominated solution). In some cases, the IROP 150 system may present the plurality of pareto-front solutions to a decision maker (e.g., individual, committee of individuals, one or more other electronic or computing systems, etc.) to select one out of the plurality of pareto-optimized options. Once a pareto-optimized option has been selected, the IROP system 150 may indicate the new baseline optimized solution to be implemented. In some example embodiments, the IROP system 150 may cooperate with one or more other systems to initiate the new baseline optimized solution. In some cases, there may be a delay 810 after identification of the irregular operation until the transition to the new baseline. The delay 810 may, in some cases, result from generating new re-optimization results. In the same or other cases, the delay may result from selecting from more than one pareto-optimized solution.

Figure 9:
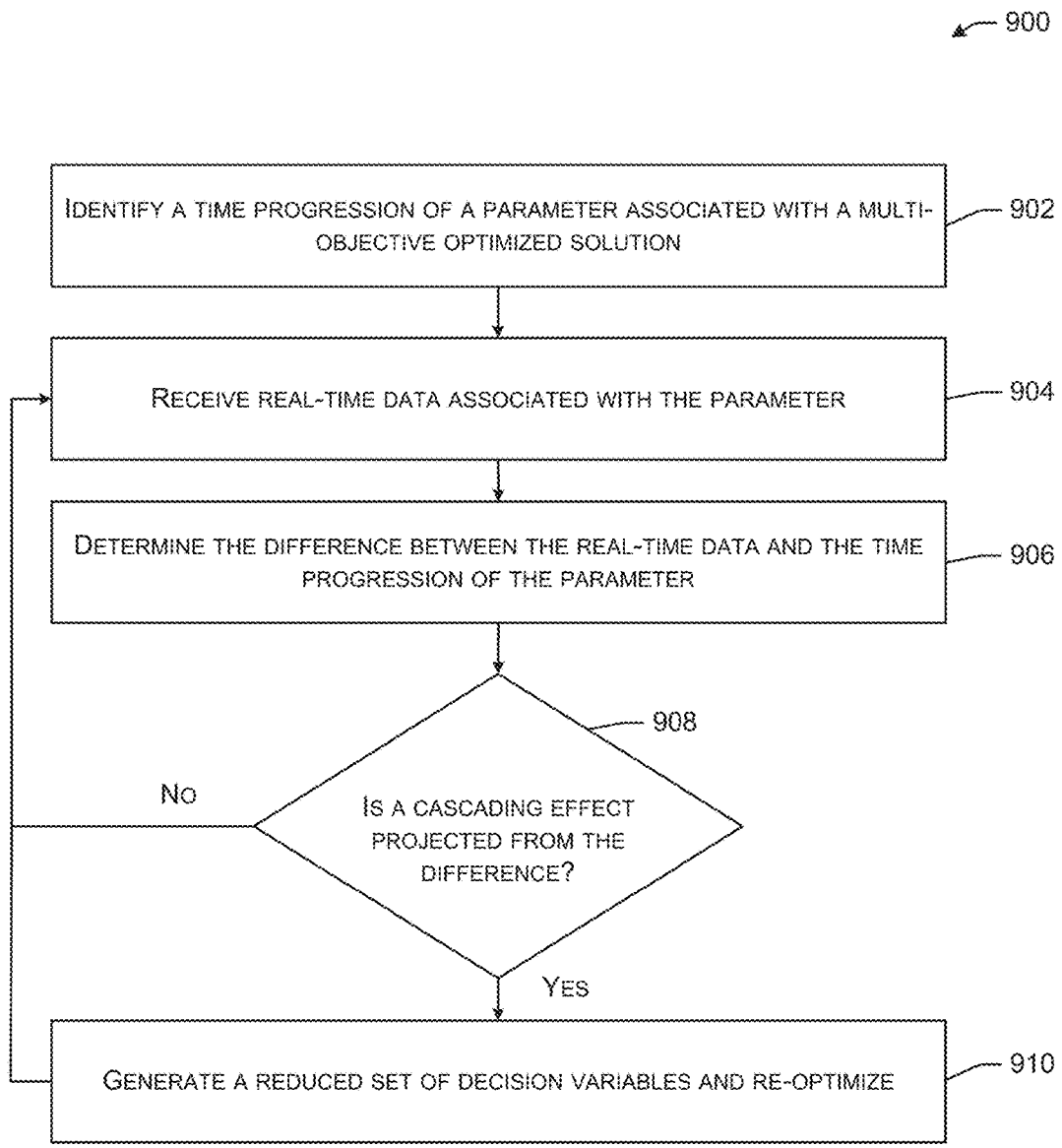
FIG. 9 is a flow diagram that illustrates an example method for identifying an irregular operation that leads to a cascading effect and requesting a re-optimization, in accordance with example embodiments of the disclosure.

FIG. 9 is a flow diagram that illustrates an example method 900 for identifying an irregular operation that leads to a cascading effect and requesting a re-optimization, in accordance with example embodiments of the disclosure. The method 900 may be performed by the IROP system in cooperation with one or more other elements, such as the MOEA system 130 and/or the live data systems 230. At block 902, a time progression of a parameter associated with a multi-objective optimized solution may be identified. At block 904, real-time data associated with the parameter may be received. At block 906, real-time data associated with the parameter may be compared to the time progression of the parameter to determine a difference between the two.

At block 908, it may be determined if there is a cascading effect projected due to the difference between the real-time data and projections thereof. If no cascading effect is projected, then the method may return to block 904 to continue receiving real-time data for comparison to estimates of the same. If, however, at block 908, it is determined that a cascading effect is indeed projected, then the method may proceed to block 910, where a reduced set of decision variables may be generated for a subsequent re-optimization and the re-optimization may be initiated. Alternatively, in example embodiments, where the MOEA system 130 continuously and/or periodically performs re-optimizations, at block 910, the latest re-optimization results may be accessed. As discussed above, in some example embodiments, the more than one multi-objective solution along a pareto-front of a re-optimization may be presented to a decision maker, such as operator 210, for selection of one out of the more than one optimized solutions. Upon selection of a suitable multi-objective re-optimized solution, the selected solution may be implemented by one or more entities controlling the system that is being optimized.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Figure 10:
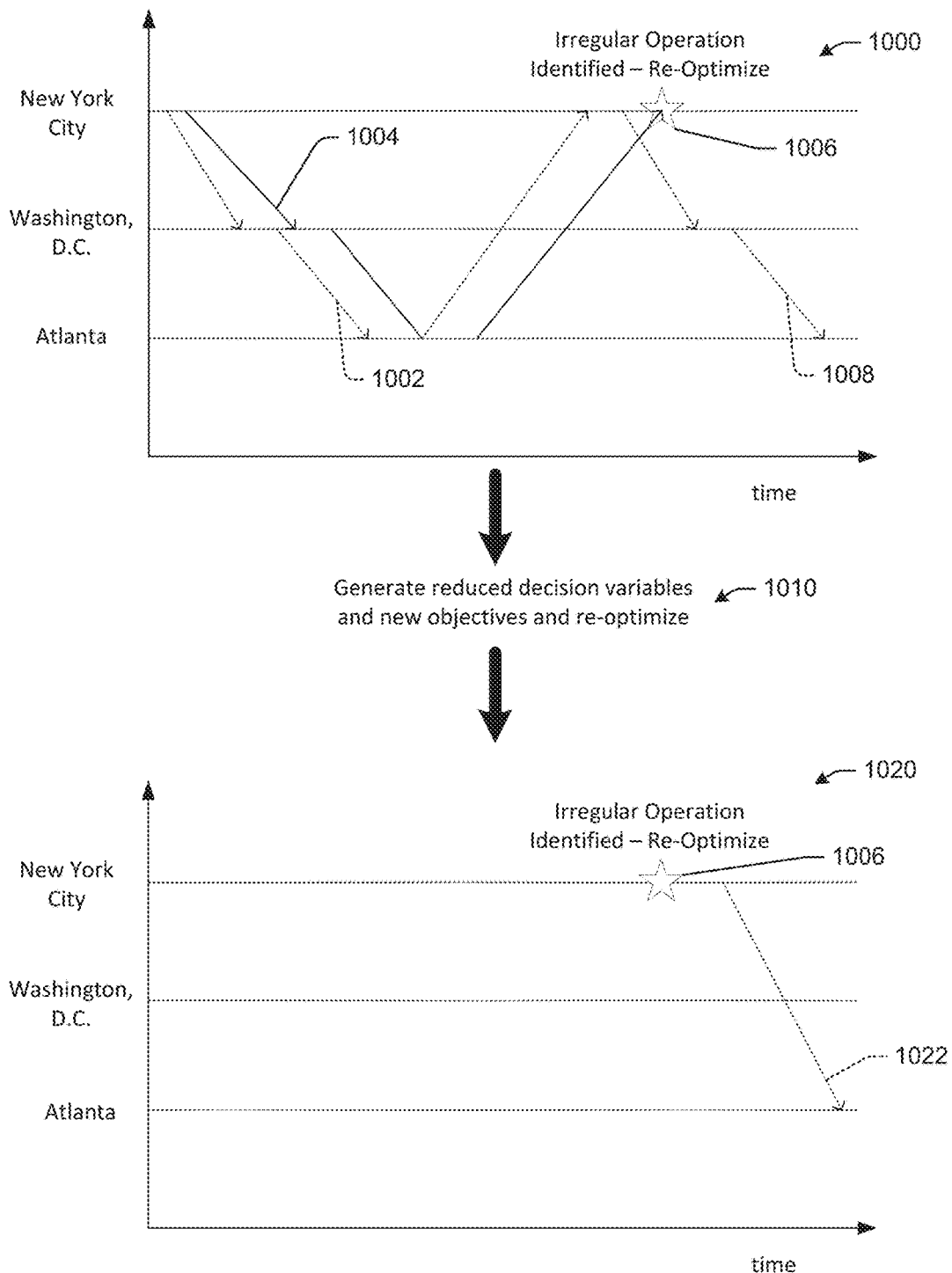
FIG. 10 is a chart that illustrates an example mechanism for identifying a cascading anomaly and implementing a new optimization target responsive to the anomaly, in accordance with example embodiments of the disclosure.

FIG. 10 is a chart 1000 that illustrates an example mechanism for identifying a cascading anomaly and implementing a new optimization target responsive to the anomaly, in accordance with example embodiments of the disclosure. In chart 1000, there may be flights flying between three cities and an optimized schedule 1002, such as from an initial optimization, of the network of flights. The flights may be optimized for any variety of objectives (e.g., revenue, profit, fuel savings, ROI, equipment utilization, etc.). The optimized schedule may be implemented by an airline and the airline may further receive live run-time data 1004. The run time data 1004 in this example shows delays in flights. As shown, delays may cascade to the point 1006, where it may be apparent that subsequent flights, such as flight leg 1008, may be delayed due to prior accumulated delays. The IROP system 150 may compare the live data 1004 to the optimized schedule 1002 of flights to identify where there may be cascading anomalies 1006. At this point, the IROP system 150 may indicate an irregular operation and either provision a re-optimization or access a re-optimization solution (e.g., the latest re-optimization schedule). Therefore, when the IROP system 150 becomes aware of a cascading effect of deviations from the baseline, it may initiate a transition to a new re-optimized baseline. The new re-optimized baseline may be determined by re-optimizing 1010 using generated reduced decision variables and new objectives. The new re-optimized baseline 1022 may be shown in chart 1020.

Figure 11:
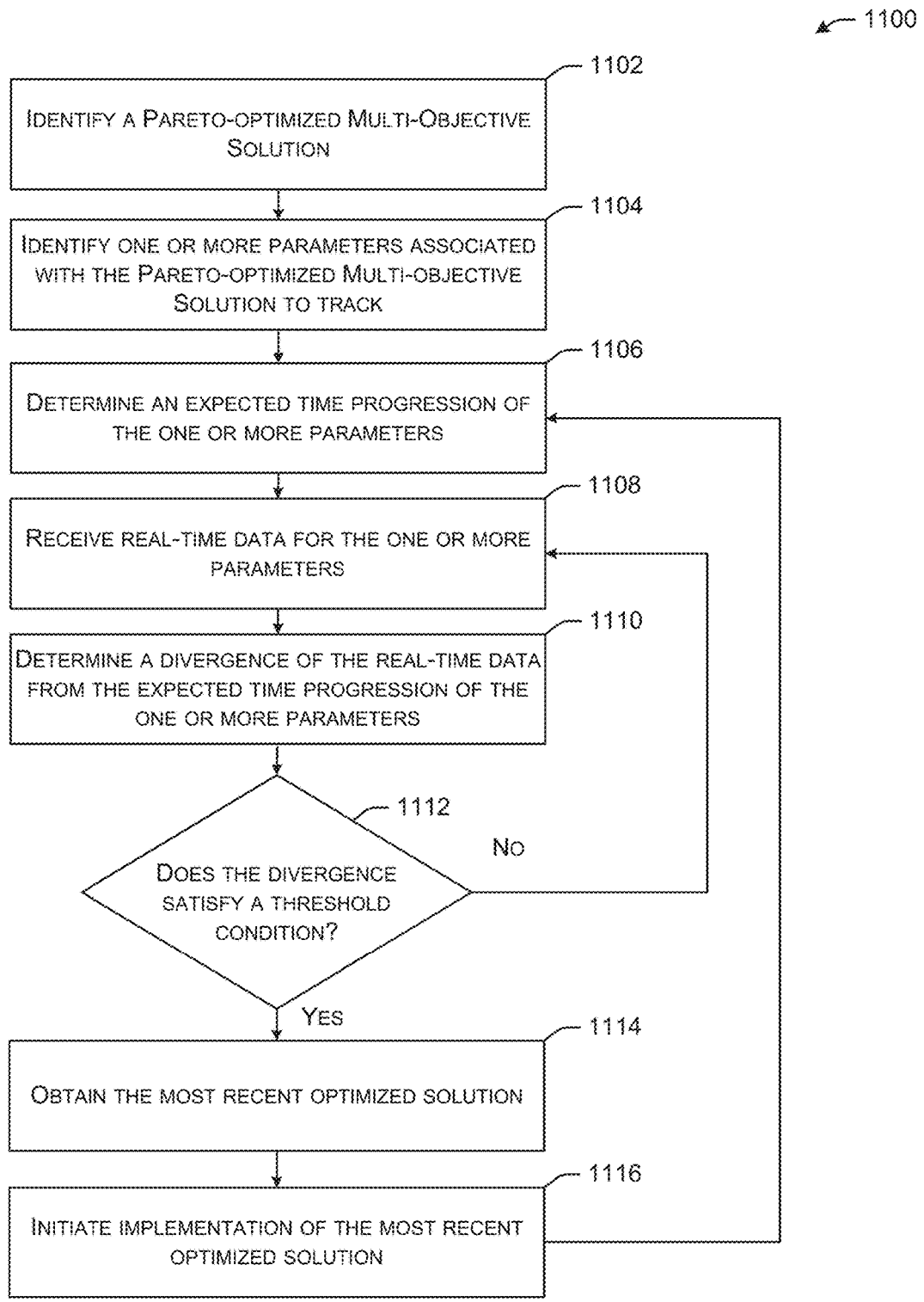
FIG. 11 is a flow diagram that illustrates an example method for performing continuous re-optimizations and selecting a re-optimization upon identifying an irregular operation, in accordance with example embodiments of the disclosure.

FIG. 11 is a flow diagram that illustrates an example method 1100 for performing continuous re-optimizations and selecting a re-optimization upon identifying an irregular operation, in accordance with example embodiments of the disclosure. The method 1100 may be performed by the IROP system 150 in cooperation with the MOEA system 130.

In these example embodiments, the MOEA system 130 may be performing continuous or periodic re-optimization. In some example embodiments, the re-optimization may be performed with a reduced set of decision variables relative to an initial optimization or any set of prior optimizations. The reduced set of decision variables may be a result of some decision variables getting frozen out during runtime, where events related to those decision variables have already transpired. For example, if there is a decision variable associated with a particular flight having a departure time of 9:30 AM and that flight had already departed when a re-optimization is performed, then the re-optimization may not attempt to optimize the departure time of that particular flight. Accordingly, the decision variable associated with that departure time may not be included in the list of variables that are to be optimized in a re-optimization. Additionally, there may be other decision variable that may not be optimized. Continuing with the airline flight scheduling non-limiting example, if flight delays (e.g., a threshold level of flight delays) for an airline network are observed only for fights on the East Coast of the United States and in no other geographic locations, then a re-optimization performed by the MOEA system 130 may particularly focus on the East Coast of the United States and not attempt to re-optimize flights in Europe, Asia, or the West Coast of the United States that may not be flying in or out of East Coast United States airports. The MOEA system 130 may further perform re-optimizations using a different set of objective(s) and/or priorities of those objectives. Continuing with the airline scheduling example, an initial baseline (e.g., first optimized solution) may be based on the multi-objectives of profit, fuel-savings, customer satisfaction metric, and accumulated delays, in that order of priority. However, in a delay induced re-optimization, the order of priority of objectives may be accumulated delays, customer satisfaction, and profit.

At block 1102, a pareto-optimized multi-objective solution may be identified. In example embodiments, this may be the initial solution to be implemented as a baseline operation or targeted operation. At block 1104, one or more parameters associated with the pareto-optimized multi-objective solution may be identified for the purposes of tracking In example embodiments, these one or more parameters may be tracking parameters that may be used for determining if the actual implementation of the multi-objective solution is sufficiently drifting away from the baseline, such that a new baseline. At block 1106, an expected time progression of the one or more parameters may be determined. At block 1108, real-time data for the one or more parameters may be received. At block 1110, a difference between the real-time data and the expected time progression of the one or more parameters may be determined.

At block 1112, it may be determined if the divergence satisfies a threshold condition. If it is determined that the divergence does not satisfy a threshold condition, then the method 1100 may return to block 1108, where real-time data may continue to be received for the purposes of comparison to expectations of the progression of the one or more parameters. If, however, the divergence does satisfy a threshold condition, then the method may proceed to block 1114, where the most recent optimized solution may be obtained. At block 1116, the most recent optimized solution may be implemented.

It should be noted that the method 1100 may be modified in various ways in accordance with certain embodiments. For example, one or more operations of the method 1100 may be eliminated or executed out of order in other embodiments. Additionally, other operations may be added to the method 1100 in accordance with other embodiments.

Figure 12:
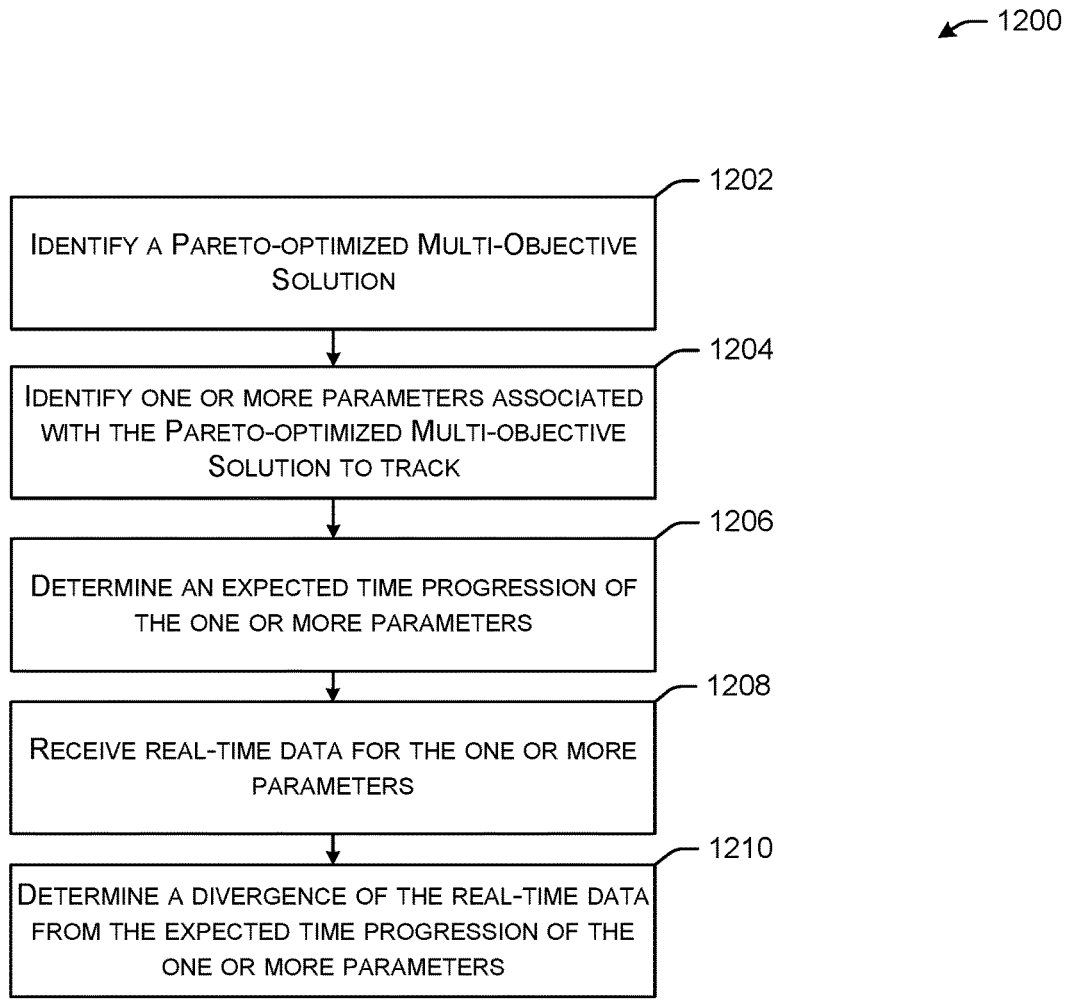
FIG. 12 is a flow diagram that illustrates an example method for performing continuous re-optimization, identifying an irregular operation, and providing a set of re-optimized solution options from which to select a new re-optimized solution to implement, in accordance with example embodiments of the disclosure.

FIG. 12 is a flow diagram that illustrates an example method for performing continuous re-optimization, identifying an irregular operation, and providing a set of re-optimized solution options from which to select a new re-optimized solution to implement, in accordance with example embodiments of the disclosure. The method 1200 may be performed by the IROP system 150 in cooperation with one or more elements of FIG. 2, such as the MOEA system 130 and/or the one or more live data sources 230. At block 1202, an irregular operation may be identified based at least in part on live data and projections of one or more parameters associated with an optimized solution. At block 1204, two or more pareto-optimized solutions may be identified. At block 1206, the two or more pareto-optimized solutions may be presented. The presentment may be via one or more user interfaces of the IROP system 150. At block 1208, an indication of selection of one of the two or more pareto-optimized solutions may be received. At block 1210, the selected pareto-optimized solution may be designated as a new target baseline. This new baseline may be the target to which the optimized system is to operate.

It should be noted that the method 1200 may be modified in various ways in accordance with certain embodiments. For example, one or more operations of the method 1200 may be eliminated or executed out of order in other embodiments. Additionally, other operations may be added to the method 1200 in accordance with other embodiments.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   receiving, by one or more processors from a multi-objective optimization system, a first multi-objective optimized solution, wherein the first multi-objective optimized solution is based at least in part on a first set of decision variables;
   providing, by the one or more processors, the first multi-objective solution as a baseline for implementation;
   identifying, by the one or more processors, a parameter associated with the first multi-objective optimization;
   receiving, by the one or more processors, a prediction of the parameter;
   receiving, by the one or more processors, live data associated with the parameter;
   determining, by the one or more processors, that an irregular operation has occurred by comparing the prediction of the parameter with the live data associated with the parameter;
   receiving, by the one or more processors and responsive to determining that the irregular operation has occurred, a second multi-objective optimized solution; and
   providing, by the one or more processors, the second multi-objective optimized solution as the baseline, wherein the second multi-objective optimized solution is based at least in part on a second set of decision variables, wherein the second set of decision variables comprise a different number of decision variables than the first set of decision variables.

2. The method of claim 1, further comprising:
   determining, by the one or more processors, the second set of decision variables, wherein the second set of decision variables have fewer decision variables than the first set of decision variables; and
   providing, by the one or more processors, to the multi-objective optimization system, the second set of decision variables.

3. The method of claim 1, wherein the second set of decision variables do not include a particular decision variable from the first set of decision variables, wherein an event associated with the particular decision variable has already transpired.

4. The method of claim 1, wherein the parameter comprises at least one of the first set of decision variables.

5. The method of claim 1, wherein the parameter is derived based at least in part on one or more of the first set of decision variables.

6. The method of claim 1, wherein receiving the first multi-objective optimized solution comprises:
   evaluating one or more first potential solutions using one or more constraint models, wherein each of the one or more potential solutions include the first set of decision variables;
   evaluating the one or more first potential solutions using one or more objective functions;
   performing one or more evolutionary operations on the one or more first potential solutions to generate one or more second potential solutions, wherein the one or more second potential solutions include the first set of decision variables;
   identifying a plurality of pareto-optimized solutions from the one or more second potential solutions; and selecting the multi-objective optimized solution from the plurality of pareto-optimized solutions.

7. The method of claim 1, wherein receiving the live data associated with the parameter comprises requesting the live data from one or more live data sources and receiving the live data from the one or more live data sources.

8. The method of claim 1, wherein determining, by the one or more processors, that an irregular operation has occurred comprises:
identifying a difference between the live data associated with the parameter and the prediction of the parameter; and
determining that the difference is greater than a threshold value.

9. The method of claim 1, wherein receiving the second multi-objective optimized solution comprises:
providing, to the multi-objective optimization system, a second set of decision variables;
providing, to the multi-objective optimization system, one or more objective models; and
initiating a re-optimization at the multi-objective optimization system.

10. The method of claim 1, wherein providing the second multi-objective optimized solution as the baseline comprises:
receiving a plurality of pareto-optimized solutions, wherein the plurality of pareto-optimized solutions include the second multi-objective optimized solution;
presenting two or more of the plurality of pareto-optimized solutions including the second multi-objective optimized solution;
receiving an indication of selection of the second multi-objective optimized solution from the plurality of pareto-optimized solutions; and
indicating the second multi-objective optimized solution as selected from the plurality of pareto-optimized solutions.

11. A system, comprising:
a memory that stores computer-executable instructions;
at least one processor configured to access the memory, wherein the at least one processor is further configured to execute the computer-executable instructions to:
provide the first multi-objective solution as a baseline for implementation;
identify a first parameter associated with the first multi-objective optimization;
receive a prediction of the first parameter;
receive live data associated with the first parameter;
determine that an irregular operation has occurred by comparing the prediction of the first parameter with the live data associated with the first parameter;
receive, responsive to determining that the irregular operation has occurred, a second multi-objective optimized solution; and
provide the second multi-objective optimized solution as the baseline, wherein the second multi-objective optimized solution is based at least in part on a second set of decision variables, wherein the second set of decision variables comprise a different number of decision variables than the first set of decision variables.

12. The system of claim 11, further wherein the at least one processor is further configured to execute the computer-executable instructions to:
determine the second set of decision variables, wherein the second set of decision variables have fewer decision variables than the first set of decision variables; and
provide to a multi-objective optimization system, the second set of decision variables.

13. The system of claim 11, wherein the second set of decision variables do not include a particular decision variables from the first set of decision variables, wherein an event associated with the particular decision variable has already transpired.

14. The system of claim 11, wherein the first parameter comprises at least one of the first set of decision variables.

15. The system of claim 11, wherein the first parameter is based at least in part on one or more of the first set of decision variables.

16. The system of claim 11, wherein the at least one processor is further configured to execute the computer-executable instructions to:
evaluate one or more first potential solutions using one or more constraint models, wherein each of the one or more potential solutions include the first set of decision variables;
evaluate the one or more first potential solutions using one or more objective functions;
perform one or more evolutionary operations on the one or more first potential solutions to generate one or more second potential solutions, wherein the one or more second potential solutions include the first set of decision variables;
identify a plurality of pareto-optimized solutions from the one or more second potential solutions; and
select the multi-objective optimized solution from the plurality of pareto-optimized solutions.

17. The system of claim 11, wherein the at least one processor is configured to receive the live data associated with the first parameter comprises the at least one processor is further configured to execute the computer-executable instructions to request the live data from one or more live data sources and receive the live data from the one or more live data sources.

18. The system of claim 11, wherein the at least one processor is configured to determine that an irregular operation has occurred comprises the at least one processor is further configured to execute the computer-executable instructions to:
identify a difference between the live data associated with the first parameter and the prediction of the first parameter; and
determine that the difference is greater than a threshold value.

19. The system of claim 11, wherein the at least one processor is configured to receive the second multi-objective optimized solution comprises the at least one processor is further configured to execute the computer-executable instructions to:
provide, to a multi-objective optimization system, a second set of decision variables;
provide, to the multi-objective optimization system, one or more objective models; and
initiate a re-optimization at the multi-objective optimization system.

20. The system of claim 11, wherein to provide the second multi-objective optimized solution as the baseline comprises the at least one processor is further configured to execute the computer-executable instructions to:
receive a plurality of pareto-optimized solutions, wherein the plurality of pareto-optimized solutions include the second multi-objective optimized solution;

present two or more of the plurality of pareto-optimized solutions including the second multi-objective optimized solution;

receive an indication of selection of the second multi-objective optimized solution from the plurality of pareto-optimized solutions; and indicate the second multi-objective optimized solution as selected from the plurality of pareto-optimized solutions.

\* \* \* \* \*